United States Patent [19]
Veltmann

[11] Patent Number: 5,619,936
[45] Date of Patent: Apr. 15, 1997

[54] THERMAL DESORPTION UNIT AND PROCESSES

[75] Inventor: Clyde R. Veltmann, Boerne, Tex.

[73] Assignee: Kleen Soil Technologies, L.C., San Antonio, Tex.

[21] Appl. No.: 319,433

[22] Filed: Oct. 6, 1994

Related U.S. Application Data

[62] Division of Ser. No. 68,556, May 28, 1993, abandoned.

[51] Int. Cl.$^6$ .............................. F23J 11/00; F23J 15/00
[52] U.S. Cl. .................. 110/345; 210/512.2; 110/236; 110/246
[58] Field of Search ................................ 110/212, 215, 110/236, 238, 244, 246, 245, 344, 345, 346; 261/79.2, 17; 210/512.2; 55/236, 238; 432/14, 103

[56] References Cited

U.S. PATENT DOCUMENTS

| | | |
|---|---|---|
| 3,661,370 | 5/1972 | Rossi . |
| 3,817,697 | 6/1974 | Parobek . |
| 3,844,770 | 10/1974 | Nixon . |
| 3,960,734 | 6/1976 | Zagorski ............... 210/512.2 |
| 4,202,282 | 5/1980 | Hobbs ..................... 110/346 |
| 4,279,627 | 7/1981 | Paul et al. ................ 55/238 |
| 4,420,901 | 12/1983 | Clarke ..................... 47/1.44 |
| 4,648,332 | 3/1987 | Goedhart .................. 110/346 |
| 4,667,609 | 5/1987 | Hardison et al. ........... 110/236 |
| 4,700,638 | 10/1987 | Przewalski ................ 110/346 |
| 4,734,109 | 3/1988 | Cox ...................... 55/238 X |
| 4,782,625 | 11/1988 | Gerken et al. .............. 47/1.42 |
| 4,815,398 | 3/1989 | Keating II et al. .......... 110/233 |
| 4,870,911 | 10/1989 | Chang et al. .............. 110/246 |
| 4,954,975 | 9/1990 | Kalata .................... 364/567 |
| 4,958,578 | 9/1990 | Houser .................... 110/246 |
| 5,020,452 | 6/1991 | Rybak .................... 110/241 |
| 5,027,721 | 7/1991 | Anderson ................. 110/236 |
| 5,036,464 | 7/1991 | Gillies et al. .............. 364/413.13 |
| 5,112,222 | 5/1992 | Flading et al. ............. 110/246 |
| 5,121,699 | 6/1992 | Frank .................... 110/246 |
| 5,184,950 | 2/1993 | Fraysse et al. ............. 110/246 |
| 5,195,887 | 3/1993 | Peterson et al. ............ 432/14 |
| 5,240,412 | 8/1993 | Mendenhall ............... 432/103 |
| 5,273,355 | 12/1993 | May et al. ................ 110/226 |
| 5,333,558 | 8/1994 | Lees, Jr. .................. 110/346 |
| 5,363,779 | 11/1994 | Bury .................... 110/236 |

OTHER PUBLICATIONS

"Soil/TEK™ ST-300 Thermal Remediation System," *Progressive Development Inc.*, Bulletin No. S61091, 4 pages, printed in USA.
Dialog Search Report dated May 18, 1993.
Proposal by George Hancock of Texas Incinerator Co., Inc. to Mr. Gil Gayaut, "Model 1010TS Soil Remediation Plant," Proposal Number 9292004, dated Sep. 30, 1992.
Quote by Dennis Hogerheide of Kalcon Dalkaska Construction Service, Inc. to Mr. Gil Gayaut, "Mobile Thermal Remediation," dated Oct. 4, 1993.

*Primary Examiner*—Henry A. Bennett
*Assistant Examiner*—Susanne C. Tinker
*Attorney, Agent, or Firm*—Arnold, White & Durkee

[57] ABSTRACT

A thermal desorption apparatus for the vaporization of volatile organic compounds and other contaminants within solid and liquid materials, such as sand, gravel, soil, clay, and industrial sludge is disclosed. The apparatus includes a generally cylindrical kiln having a bellows seal located at an inlet port, an outlet port, a fire box, an after burner, a quench tube assembly, a water cyclone having a rotary cylinder and a recyclable water tank system and pump. The kiln also includes a sludge and liquid injection port for the processing of contaminated liquid materials, as well as a computer controlled regulating system and program for operation of the apparatus. The apparatus also includes an entry port screw auger and an exit port screw auger, as well as a series of stationary paddles affixed to the inside kiln walls.

26 Claims, 14 Drawing Sheets

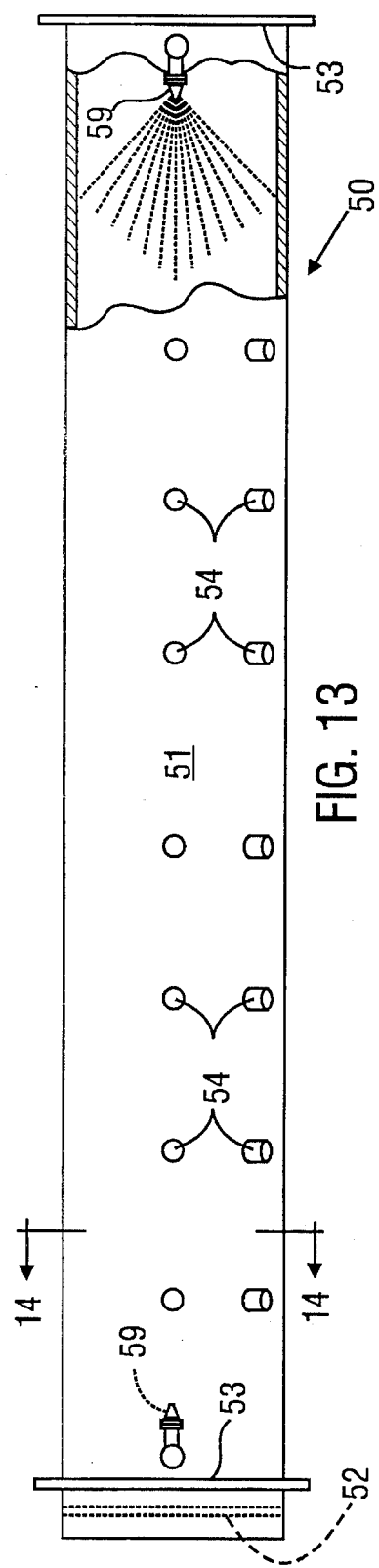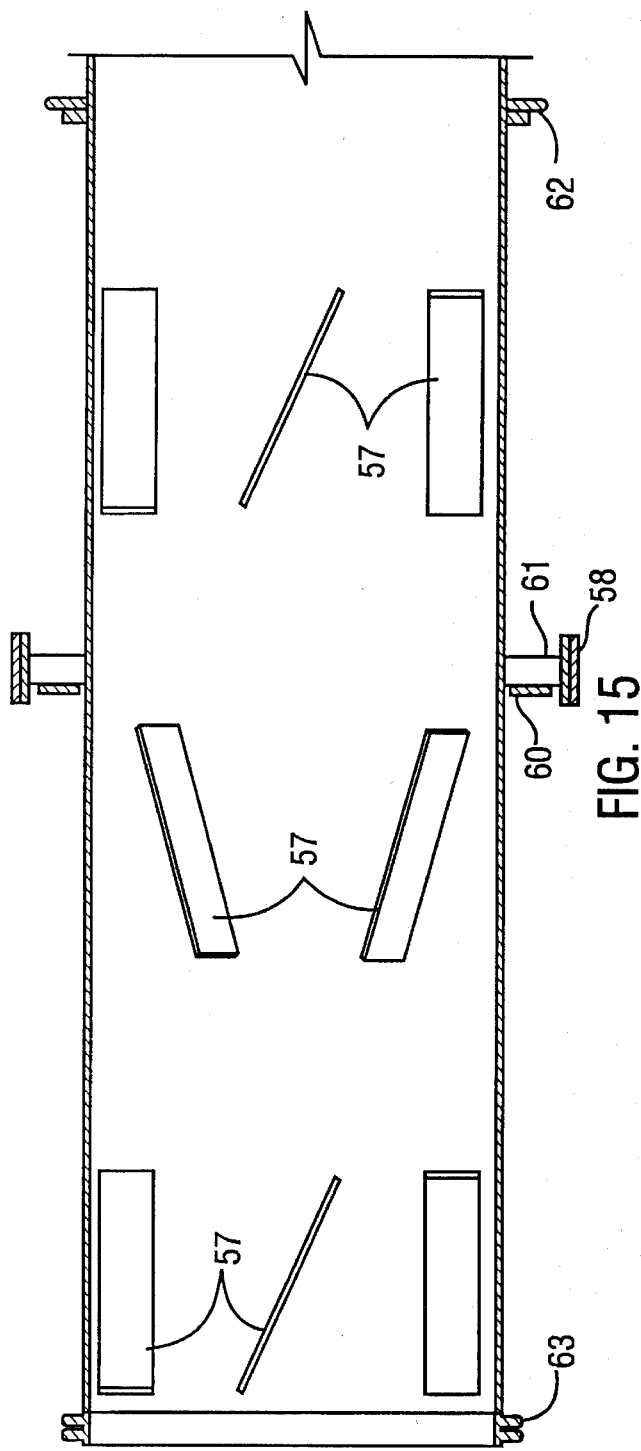

THERMAL DESORPTION UNIT AND PROCESSES

This is a divisional of application Ser. No. 08/068,556 filed May 28, 1993 now abandoned.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to a method and apparatus for removing contaminants from various materials, including soil, gravel, clay, sand, industrial sludge, volatile organic material containing liquids and other solid and petroleum waste products. Soil processed according to the invention are rendered free of many contaminants and will support plant growth.

BACKGROUND OF THE INVENTION

The overall concern for the quality of the environment has raised renewed interest in the manner in which various chemicals are synthesized, refined, stored, and used, Specifically, there is a growing concern regarding the manufacture, storage, and distribution, as well as with the waste generated during retail storage of such materials.

For example, hydrocarbon fuels such as gasoline and household fuel oil are often stored in tanks which are buried at central distribution points or at retail service stations. During storage, transport, and sale of these materials, tank leaking or spilling often occurs, creating an area of environmental contamination which may ultimately prove hazardous.

One common means of alleviating the environmental hazard is removing and disposing of this contaminated soil in a landfill. However, landfill disposal of this contaminated matter may often be a time consuming and expensive endeavor, as well as being subject to burdensome government regulations.

Contaminated soil may also be treated to remove the hydrocarbon waste through various means. Processes for the thermal remediation of contaminated soil have been developed and refined. For example, Clarke, U.S. Pat. No. 4,420,901 relates to a tractor drawn farm implement for decontaminating fields. Goedhart, U.S. Pat. No. 4,648,332 relates to a fluidized bed furnace for decontaminating soil. Przewalski, U.S. Pat. No. 4,700,638 relates to an apparatus for the disposal of hazardous material such as dioxin and polychlorinated biphenyls through a thermal process.

U.S. Pat. No. 4,815,398 relates to a rotary dryer for thermally decontaminating soils. Gerken et al., U.S. Pat. No. 4,782,625 relates to a materials dryer used to decontaminate soils. Hardison et al., U.S. Pat. No. 4,667,609 relates to an infrared apparatus for thermally decontaminating soils. Other methods of treatment include processing soil in converted stationary asphalt plants. However, these processes are not portable and generally produce a high concentration of particulate exhaust.

U.S. Pat. No. 4,667,609 relates to an apparatus for the treatment of soil contaminated with hydrocarbons, including a sealed negatively pressurized high temperature furnace wherein the multi-zone heater is maintained at about 2900° F.

U.S. Pat. No. 4,202,282 relates to a method and apparatus for processing sewage sludge through the use of infrared radiation under a slight vacuum to capture the noxious odors.

U.S. Pat. No. 4,870,911 relates to an incinerator pyrolyzer for continuously burning waste material in a rotating kiln.

U.S. Pat. No. 5,020,452 relates to a thermal remediation apparatus that includes a condensing system for cooling exhaust gases rendered from a combustion chamber after processing of contaminated soil. The water used in the condensing system does not contact exhaust fumes directly. Particulate material in the exhaust generally falls into a draw off box, with cleaned exhaust being pulled from the condensation system through a fan and into the environment. However, the pollutants present within the exhaust gases which enter into the condensing system may not be sufficiently cleaned using such a condensation system, thereby leaving the problem of possible contaminants escaping from the system into the environment, even after passage through the condensation system and exhaust mechanisms.

Another method for processing the hot gases which result from combustion of a contaminated soil sample is set forth in U.S. Pat. No. 5,195,887. In this system, the hot gases and fines are processed through a dryer system that facilitates separation of the materials in the exhaust into a gas phase and a solid phase. Gases containing uncombusted volatile organic compounds are then directed back to the primary dryer for additional exposure to heat in order to complete combustion. Additional separation of the fines from these gases is achieved in a bag house.

Other separation means described in the art for removing fines contained in exhaust gases from the combustion of contaminated soil include a scrubber or stripper column filled with a liquid or a gas to capture particulate species (U.S. Pat. No. 5,195,887). In this regard, columns filled with carbon are used to absorb fines based on organic residues. The solvent or absorbent used may depend upon the particular species involved. Such processes inherently introduce problems of proper selection and disposal of the liquid Solvent or the carbon absorbent used to trap the captured fines.

The present invention employs a water based system to wash volatilized contaminants rendered from a contaminated soil combustion (unpublished observations). However, problems remained regarding suitable disposal of the resulting contaminated water used, as well as the large volumes of water that would be continuously required to run a water-based vapor washing system.

Disposal of contaminated water may often be a time-consuming and expensive endeavor, as well as being subject to burdensome government regulations. Accordingly, the inventor recognized a need for a self-contained and waste conscious vapor washing apparatus that would enhance the cleaning efficiency of the vapors over that available with "condensing" systems, and that most preferably efficiently would recycle and contain any contaminant isolated from the material being processed in a safe and convenient manner. A system that could decontaminate large quantities of contaminated liquid materials having volatile organic compounds is also a need perceived by the inventor. To date, no thermal-based system for processing industrial sludge is available.

The apparatus and methods described in the aforegoing patents generally utilize expensive and sophisticated machinery to dispose of contaminants such as dioxin and polychlorinated biphenyls (PCBs). Moreover, these mechanisms use high volumes of air, which necessitate a variety of complex exhaust filtering and cleaning systems. Finally, the previously disclosed devices and processes are generally either completely stationary or, alternatively, portable But require the expenditure of extended time, energy, and space in transport and set up.

Accordingly, there is a need for a portable thermal desorption apparatus which is capable of removing contaminants from soil and other particulate and liquid compositions that does not require complex exhaust treatment systems, that is capable of recycling processing materials, such as water, efficiently and quickly, and that may be used at the contamination site with a minimum expenditure of space, set-up time, and energy.

SUMMARY OF THE INVENTION

The problems and disadvantages Of currently available thermal processes and apparatuses fundamentally concern their inability to decontaminate vast quantities of contaminated liquid and solid materials rapidly and efficiently while simultaneously controlling the production of other secondary contaminated processing materials. For example, the processes and apparatus of the present invention successfully provide for the decontamination of vast quantities of contaminated soil, gravel, clay, loam, or sand and the like that includes an improved quench tube assembly and water clone system that enhances the removal of fines and contaminants from exhaust fumes generated through the combustion of a material from a central rotating kiln.

Therefore, one aspect of the present invention is to provide a high capacity, high speed contaminated materials desorption process and apparatus for carrying out the process.

A further aspect of the present invention is to provide a materials desorption process and an apparatus for carrying out the process that optimizes the removal of volatile organic contaminants from soil, as well as liquid industrial sludge and the like.

An additional aspect of the present invention is to provide a highly efficient and less expensive process and apparatus for carrying out the process as compared to other on-site decontamination processes and apparatuses.

Another aspect of the present invention is to provide a highly versatile desorption process and an apparatus for carrying out the process in which operating parameters may be continuously monitored and adjusted as necessary to achieve the desired degree of cleanliness, to accommodate materials with varying compositions and contamination levels and to provide a method for the processing of liquid contaminated materials, such as industrial sludge.

An additional aspect of the present invention is to provide a decontamination desorption process and an apparatus for carrying out the process in which the hot gases and fines generated thereby can be cleaned more efficiently and thoroughly that employs a recycling system for wash water employed in the cleansing steps, and which does not employ the use of conventional bag house separation means. In this regard, a fully recyclable system wherein a quench tube assembly system that employs water to cleanse particulate matter and vapors is provided, wherein spent water is fully recycled through a uniquely designed water cyclone system and series of separation tanks yielding essentially purified water suitable for reuse through the system.

These and other aspects of the present invention are provided in a process and apparatus in which a contaminated particulate or liquid material is heated and purged of volatile organic contaminants. A negative pressure kiln rotates a complete 360°, and together with the action of a series of stationary paddles affixed to the inside walls of the kiln, promotes the efficient mixing and even distribution of heat through a material being processed. The kiln is also fitted with a bellows system at least at the entrance end of the kiln to control the leaking of materials, such as smoke, dust, and the like, from the kiln during processing. This unique bellows system is described in greater detail herein.

In one particular aspect, a portable decontaminating apparatus for the volatilization of elements in a liquid or solid material is provided. This apparatus, in one embodiment, comprises a rotating kiln having a front end with an inlet for solid materials and a liquid injection port, a rear end having an outlet for solid materials, sationary paddles, a vapor port, a means for heating material, and at least one bellows seal. Another embodiment of the apparatus comprises a water cyclone having a liquid inlet, an outer cylinder, a vapor outlet, a liquid outlet, a plurality of spray nozzles, and a rotary assembly in communication with said liquid outlet. The rotary assembly of the water cyclone is more particularly defined as having an inlet, an outlet, and a rotary cylinder having a plurality of paddles and a rotary liquid outlet. A most preferred embodiment of the apparatus includes a rotary kiln having a front end with an inlet for solid materials and liquid injection port, a rear end having an outlet for solid materials, stationary paddles, a vapor port, a means for heating material within the kiln, and at least one bellows seal, and a water cyclone having a liquid inlet, an outer cylinder, a vapor outlet, a liquid outlet, a plurality of spray nozzles, and a rotary assembly as described above.

The most preferred embodiment of the apparatus comprises a rotating kiln having a front end with an inlet for solid materials and a liquid injection port, a rear end having an outlet for solid materials, stationary paddles, a vapor port, a means for heating material within the kiln, and at least one bellows seal at the front end of the kiln, a fire box having a front end and a rear end, said front end being in communication with the rear end of the kiln, said fire box also having an exit auger discharge tube and communication with the rear end of the fire box, an after burner having an interior chamber, a vapor inlet, a gas outlet, and a means for heating material within the after burner. The after burner is described as being in communication with the vapor port of the kiln. The apparatus further comprises a quench tube having an interior chamber with a plurality of spray nozzles, an inlet, an outlet, and wherein said quench tube inlet is described as being in communication with the gas outlet of said after burner. A wash box also comprises the device, the wash box having an inlet, an outlet, and being in communication with the outlet of the aforedescribed quench tube, as well as a water cyclone having a liquid inlet, an outer cylinder, a gas outlet, a liquid outlet, a plurality of spray nozzles, and a rotary assembly in communication with said liquid outlet. The rotary assembly is also described as having an inlet and an outlet. This preferred embodiment of the apparatus further comprises at least one tank having an inlet, and at least one outlet line, the tank inlet being in communication with the water cyclone liquid outlet described above. In a particular embodiment of this aspect of the apparatus, the tank is described as having two inlets, at least one being in communication with the wash box.

The apparatus may also optionally include a loading means for loading particulate material into the kiln, such as a hopper or other loading device known to those of skill in the art. The apparatus may also optionally include a crushing means capable of reducing the particulate size of a material to less than 1½ in diameter, the crushing means also having a means for feeding sized particulate matter into the kiln. By way of example, such crushing means may comprise a hammermill, a jaw crusher, or an impact mill.

The apparatus of the present invention has an operating capacity of between about 10–40 tons per hour of contaminated material. The contaminants that may be removed using the apparatus and process of the present invention include sulfur, heavy metals, hydrocarbons, polychlorinated biphenyls, volatile organic compounds, and semi-volatile organic compounds.

The apparatus in a most preferred embodiment includes four tanks. Inclusion of four tanks has been observed by the inventor to provide superior filtering benefits of liquid materials that are used to wash vapors and gases through the apparatus and process.

The apparatus may also optionally include a test stack. The test stack extends out of the water cyclone. An exhaust fan may also be included. Inclusion of a test stack with the apparatus provides for the relatively easy sampling of gases and emissions from the apparatus. Air quality standard of a particular locality may thus be complied with during operation of the apparatus, as the apparatus can continue to operate while such gas and/or emissions are collected for testing.

The apparatus of the present invention is most preferably controlled by a computer control unit. This computer control unit regulates the functioning of the apparatus, and is most preferably run on a computer program as defined in the source code of Appendix A. The computer program follows a Ladder Logic language, and may be subject to copyright protection.

It is anticipated that the present invention may be useful for the decontamination of essentially any particulate or liquid material. By way of example, such materials include soil, loam, sand, gravel, clay, hospital waste, and the like, as well as a mixture of these materials. By way of example, liquid materials that may be decontaminated and processed with the claimed apparatus include industrial sludge, sewage, or a mixture thereof.

The unique structure of the rotating kiln most preferably includes a unique bellows seal system located at the entrance end of the kiln. The exit end of the kiln may also optionally include a bellows seal system.

In preferred embodiments of the apparatus, the exit auger discharge tube from the aforedescribed fire box optionally includes a series of water nozzle ports to facilitate the rapid cooling and control of airborne fine materials as they exit the apparatus.

As already described, the invention also encompasses a thermal desorption process for removing volatile organic compounds from liquid or solid materials with a thermal desorption apparatus. The apparatus for achieving this process is most particularly described as comprising a rotating kiln having a bellows seal, an injection port, a series of stationary paddles, a liquid injection port, and a vapor tube. The apparatus of the process also includes a quench tube having at least one water spray nozzle, a water cyclone system having a series of water spray nozzles and an outer cone-shaped chamber, an inner cylindical tube, and an outlet rotary assembly. The process in one embodiment is described as comprising the steps of heating and agitating the material to a temperature of about 750° F. or greater inside the kiln, heating the suspended material a time sufficient to volatalize organic compound vapors in the material, oxidizing the vapors to a gas and then venting the gas to a quench tube where the gas is passed through a water wash, evacuating the washed gases to a water cyclone and exposing the gases to a subsequent water wash within this water cyclone, and releasing the water washed gases from the thermal desorption apparatus, and releasing decontaminated materials from the kiln exit port. The process will provide the processing of a material at a rate ranging from about 20 tons per hour to about 40 tons per hour, such as for example, in the processing of soil.

The process may also optionally include an additional step of reducing the particulate size of the solid material to be processed to a diameter of about 1½ inches. The thermal desorption apparatus of the process may additionally comprise an after burner in communication with an exhaust port of the kiln. The after burner chamber would then lie in further communication with the aforedescribed quench tube. The after burner most preferably operates at a temperature ranging from about 1400° F. to about 2600° F. The process is expected to be useful for the removal of heavy carbons, hydrocarbon, polychlorinated biphenyls, and virtually any volatile or semi-volatile organic material.

The aforedescribed processes also demonstrated to be useful in the decontamination of the aforedescribed partial list of contaminants in, for example, industrial sludge, sewage, or a mixture thereof.

In most preferred embodiments of the apparatus, all surfaces of the apparatus and parts thereof that come into contact with or which are expected to come into contact with water are to be treated with a material that will provide scale and rust resistance to the apparatus. The inventor in this regard has treated surfaces within the apparatus that come into contact with water by sandblasting the surfaces and then coating the surfaces with zinc.

Other advantages and features of the apparatus of the present invention will become obvious with the further disclosure provided herein.

BRIEF DESCRIPTION OF THE DRAWINGS

FIG. 13 is a planned view of the quench tube/scrub system.

FIG. 15 is a cross-sectional view of the entry end of the kiln. Structure 57 depicts the permanently affixed paddles located along the inside walls of the kiln. 63 depicts the bellows system.

TABLE OF APPARATUS PARTS

Figure 1:
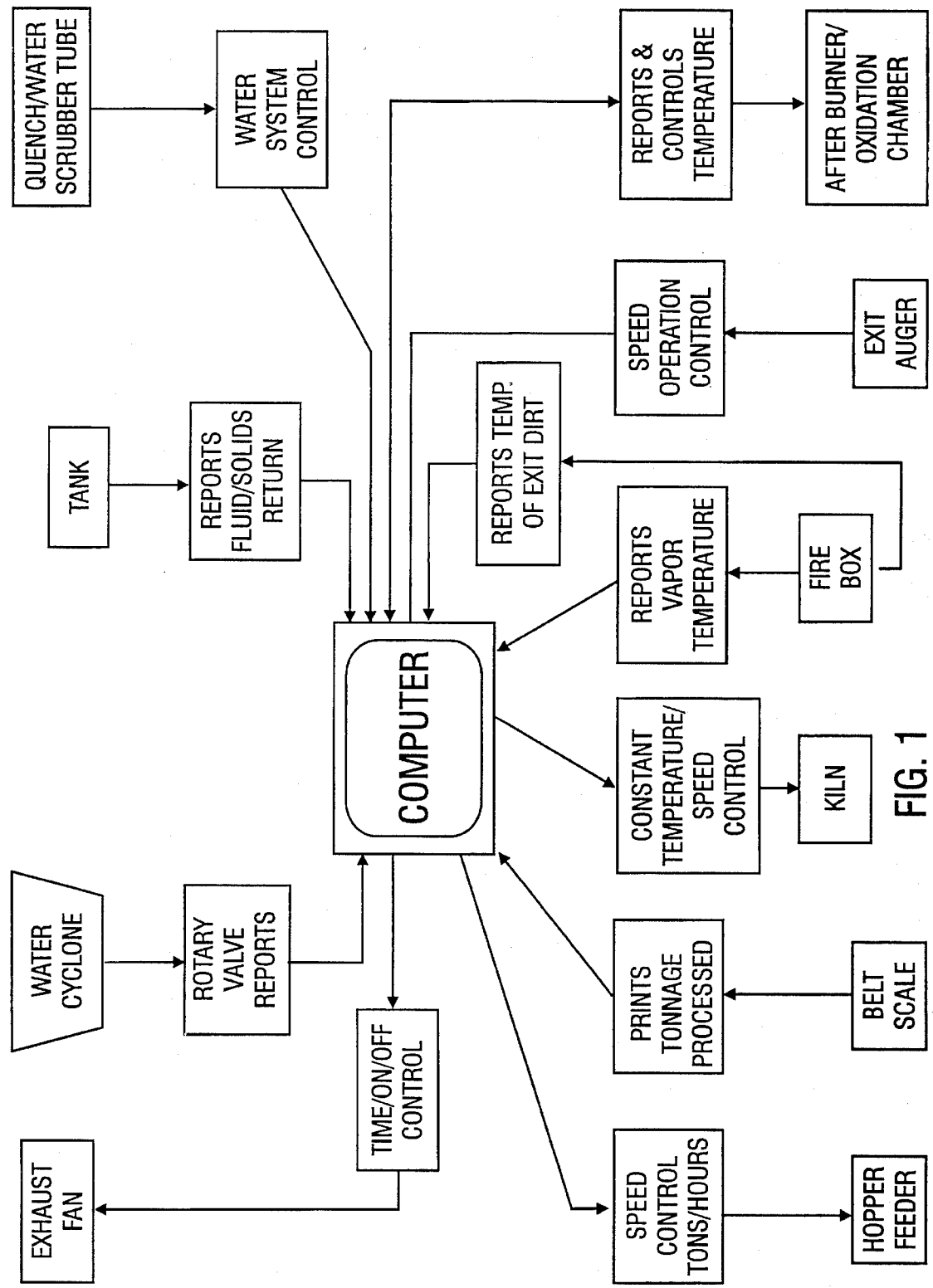
FIG. 1 is a flowchart of the overall flow of control of the present invention from a central computer system.

| | | | |
|---|---|---|---|
| 1. | Hopper/Feeder | 42. | Rotary Assembly |
| 2. | Fire Box | 43. | Motor |
| 3. | After Burner Chamber | 44. | Rotary Cylinder |
| 4. | Discharge Tube | 45. | Paddle |
| 4a. | Auger Drive | 46. | Tank |
| 4b. | Auger | 47. | Return Tube (From Wash Box) |
| 4c. | Spray Nozzle | | |
| 4d | Sensor | 48. | Water Flow Line |
| 4e | Sensor Bar | 49. | Mobile Control Unit |
| 5. | Wash Box | 50. | Quench Tube Assembly |
| 6. | Frame | 51. | Quench Tube |
| 7. | Exhaust Fan | 52. | Inner Flange |
| 8. | Computer Control | 53. | Outer Flange |
| 9. | Test Stack | 54. | Coupling |
| 10. | Desorption Apparatus | 55. | Water Supply Line |
| 11. | Kiln-Inner Tube | 56. | Spray Nozzle |
| 12. | Crusher/Feeder | 57. | Paddle |
| 13. | Liquid Injection Port | 58. | Kiln Support Ring |
| 14. | Wiper Blade Arm | 59. | Circular Spray Pattern |
| 15. | Vapor Port | 60. | Horizontal Bar |
| 16. | Screw Auger | 61. | Spacer |
| 17. | Vapor Tube | 62. | Sprocket |
| 18. | Bellow | 63. | Kiln Bellow Finger |
| 19. | Kiln Entrance Port Wall | 64. | Chain |
| 20. | Kiln Assembly | 65. | Kiln Drive Motor |
| 21. | Cradle Assembly | 66. | Material Flow (Solid Arrows) |
| 22. | Suction Fan | | |
| 23. | Water Supply (To Wash Box) | 67. | Liquid Gas Line |
| | | 68. | Vaporizer |
| 24. | Water Line (Pump 1 to Pump 2) | 69. | Center Nozzle |
| | | 70. | Vapor Flow (Kiln to After Burner) |
| 25. | Water Return Line | | |
| 26. | Burner & Blower | 71. | Gas Flow to Quench Tube |
| 27. | Burner & Blower | 72. | Gas Flow to Wash Box |
| 28. | Exit Gas Port | 73. | Gas Flow Inside Wash Box |
| 29. | Belt Scale | 74. | Gas Flow to Cyclone |
| 30. | Water Cyclone Assembly | 75. | Gas Flow (Inside Cyclone) |
| | | 76. | Gas Flow To Exhaust Fan |
| 31. | Outer Cyclone Wall | 80. | Cradle Roller |
| 32. | Inlet Tube (From Wash Box) | 81. | Roller Bracket |
| | | 82. | Positioning Roller |
| 33. | Gas Outlet Tube | 83 | Positioning Bracket |
| 34. | Bottom Outlet (Water) | 84. | First Sensor Bar |
| 35. | Gas Outlet Tube (To Exhaust Fan) | 85. | Second Sensor Bar |
| | | 86. | Sensor |
| 36. | Water Supply Line | | |
| 36a. | Spray Nozzle Unit | | |
| 37. | Water Line | | |
| 37a. | Spray Nozzle Unit | | |
| 38. | Water Line | | |
| 38a. | Spray Nozzle Unit | | |
| 39. | Water Line | | |
| 39a. | Spray Nozzle Unit | | |
| 40. | Water Line | | |
| 40a. | Spray Nozzle Unit | | |
| 41. | Water/Air Flow | | |

DETAILED DESCRIPTION OF THE PREFERRED EMBODIMENT

The thermal desorption and process and apparatus of the present invention are described in connection with FIGS. 1–19.

The process and apparatus herein discloses a high speed, high throughput method and apparatus for removing volatile organic contaminants from particulate material as well as liquid materials. The process is highly flexible with regard to the types of particulate materials that may be treated in terms of mixture, feed rate, and temperature conditions suitable for complete volatilization of the contaminants to relatively innocuous compounds, like carbon dioxide and water. The apparatus itself offers the advantage of lower cost of operation and maintenance, the apparatus is designed so as to facilitate most repairs using primarily off the shelf available components. The apparatus is also easily transported to virtually any work site where the contaminated material, such as soil, gravel, sand, or industrial sludge and the like is located. The apparatus is equipped with its own generator, G, preferably a 92 k10 Generac generator. The generator eliminates the need for on-site electrical sources. The generator may then be employed to supply electricity to the apparatus by electrical feed lines, or "umbilical" electrical cords E. A vaporizer 69 vaporizes gas, propane and the like fed into the vaporizer 69 through liquid gas line 67. Vaporized gas then travels through vaporized gas line 69 to the apparatus.

To describe various aspects of the process and apparatus of the invention in further detail, volatile contaminants present in a material are vaporized in the kiln at temperatures of up to 2000° F., forming a decontaminated soil or other material and hot gases containing the volatilized contaminants, as well as fines. The hot gases and vapors resulting from the combustion of a material containing volatile organic materials is treated simply and efficiently through further oxidation in an after burner chamber and washing in a quench tube, water box and water cyclone system. More specifically, vapors are subject to an open flame in the after burner to further oxidize any residuary contaminants in the vaporized materials from the kiln. The flames are blown into the after burner chamber by a blower fan that constitutes part of the burner assembly 27. The vapors then pass into a unique, cylindrically shaped quench tube assembly 50, that is fitted with a series of water spray nozzles 56. Water is sprayed in a round fan pattern in the quench tube directly against the flow of the gases rendered from the after burner chamber. This system creates a back pressure within the quench tube, and will reduce or add to the amount of required retention time necessary to achieve removal of volatile contaminants. The water spray of the vaporized material in the quench tube assembly 50 also allows for the removal of fines and other solid particulate material that may remain airborne after processing through the kiln.

Figure 4:
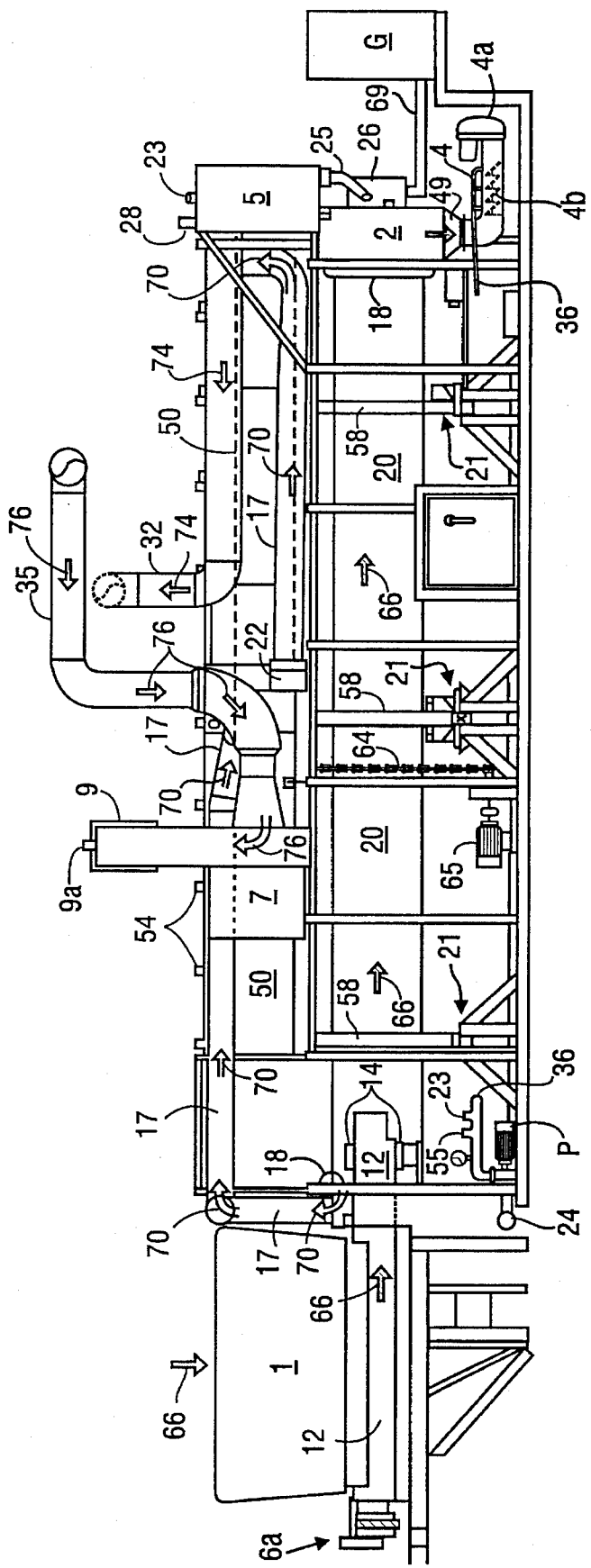
FIG. 4 is a side view of embodiment 1 of the thermal desorption-unit.
Figure 5:
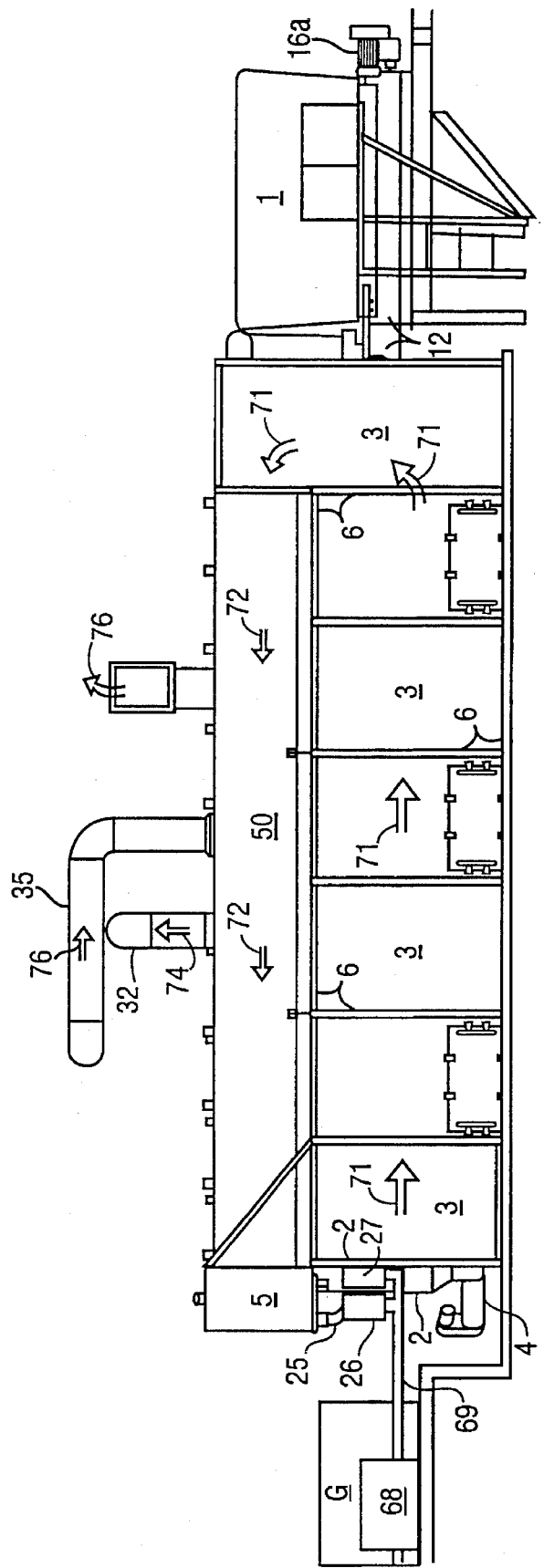
FIG. 5 is a side view of embodiment 1 of the thermal desorption unit.

A suction fan 22, FIG. 4, is included in the structure of one embodiment of the apparatus. The suction fan is in communication with the vapor port of the kiln 20 and the after burner chamber 3, and functions to evacuate vapor from the kiln 20 to an after burner chamber 3. This suction fan 22 is not included in a second embodiment of the apparatus without loss of overall operating efficiency, as shown in the structure of the apparatus in FIGS. 6 and 7. Equal efficiency is maintained by increasing the horse power of the exhaust fan 7, for example from about 5 hp to about. 7 hp.

Vapors from the after burner chamber then pass into a quench tube 50.

Figure 2:
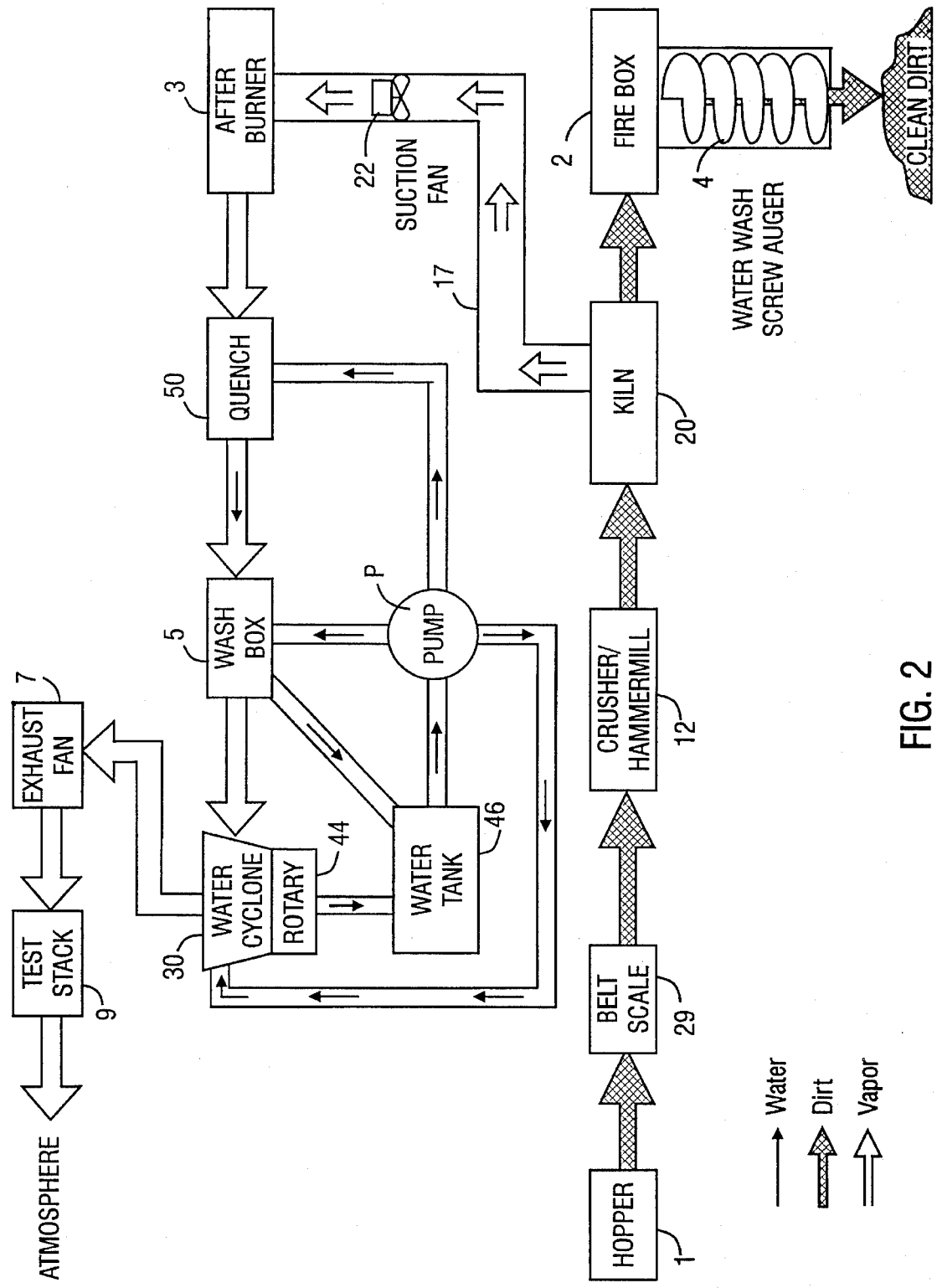
FIG. 2 is a flowchart of the components of the apparatus.
Figure 3:
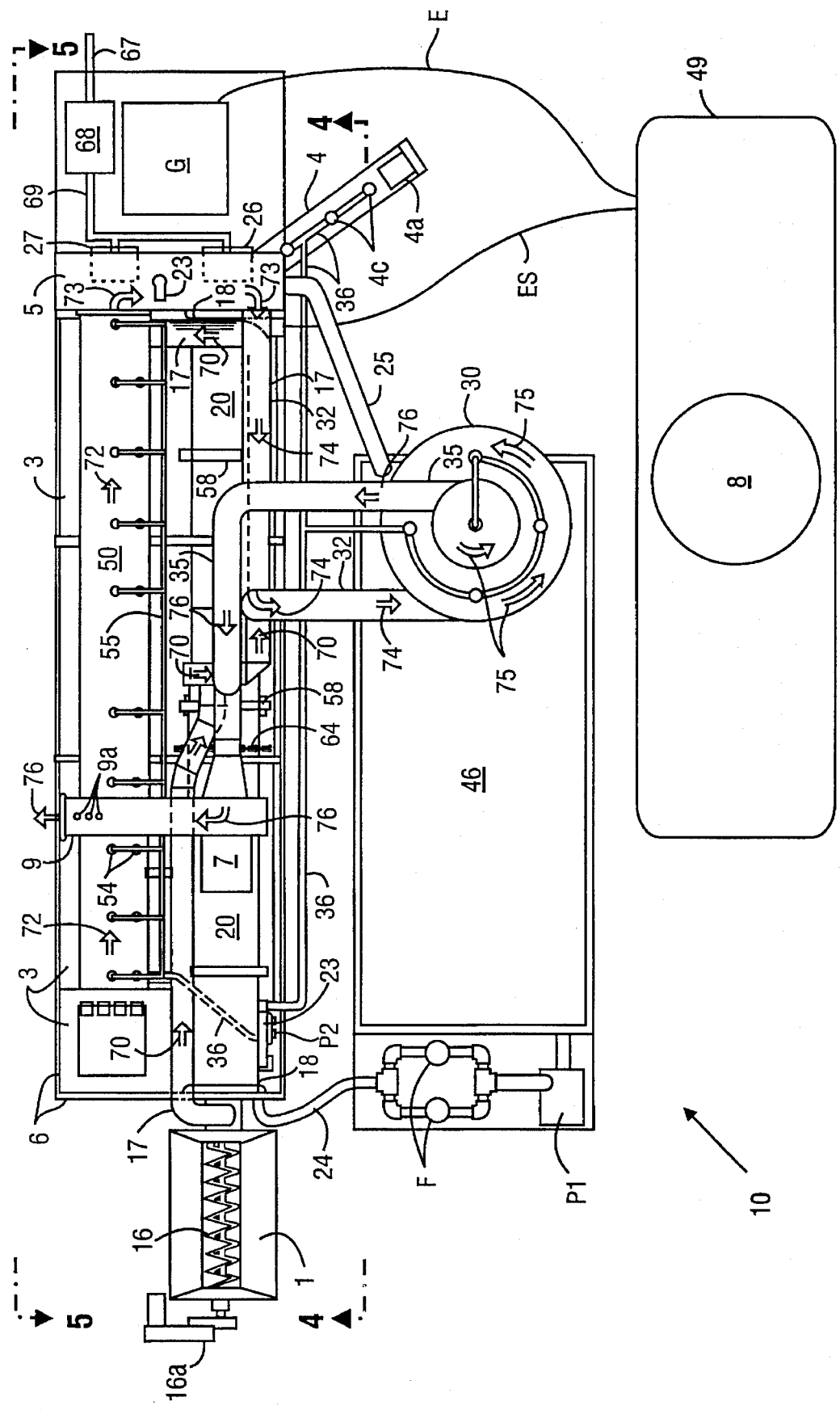
FIG. 3 is a top view of embodiment 1 of the thermal desorption unit. This embodiment includes two vacuum fans.

The water employed in the quench tube system 50 drains out into a wash box 5. Water and solids from the wash box drain into a tank 46. Steam and gas from the wash box.5 then pass into a water cyclone 30. In the water cyclone 30, the gases are purified of contaminants and subsequently recycled through water lines from the pump to the water spray system of the quench tube, the wash box and the water cyclone. A water pump P1 facilitates the rapid movement of recycled water from the tank to the respective parts of the apparatus (FIG. 2). A completely closed water recycling system is thereby provided. Preferred embodiments of the apparatus include an exhaust fan 7 in communication with the water cyclone 7 for hastening the movement of gas and air into and out of the cyclone.

The apparatus capable of processing large quantities of materials (up to 40 tons/hr) are portable and compact, allowing easy transport and setup in about 2 hours in a minimal area of approximately 2500 sq. ft. The apparatus may also be operated by only one person and has a construction which allows the system chamber to be easily opened, providing easy access for cleaning, or any other reason.

Figure 9:
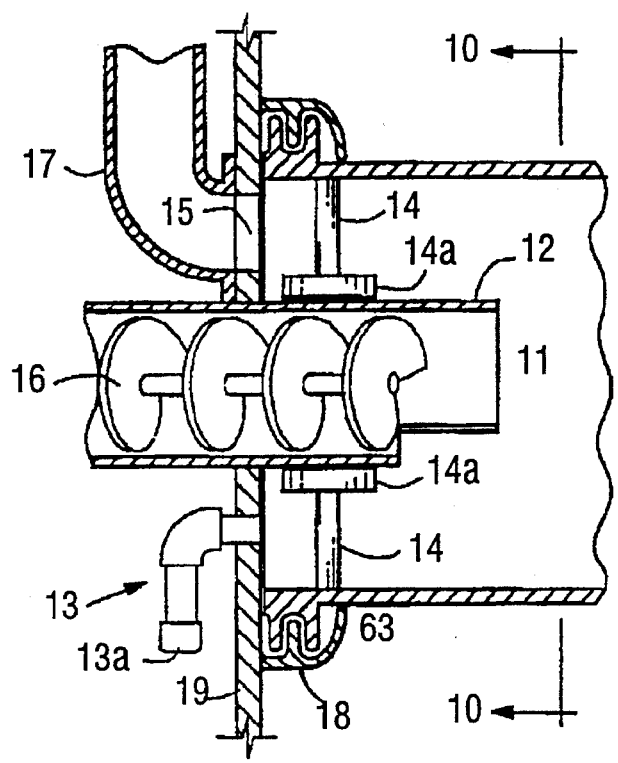
FIG. 9 is a cross-sectional view of the left-hand end of the kiln. Detail in the figure shows the structure of the bellows seal located at the entry end of the kiln (see #63 and #18). Detail in FIG. 9 also depicts the wiper blade arm 14 and blade 14A, that are permanently affixed to the inside wall of the kiln closest to the entry port of the kiln. The wiper blade functions to remove fine and particulate obstructions to the vapor tube entrance port 15 feed tube leading to vapor tube 17, which in turn feeds to the after-burner chamber 3.
Figure 10:
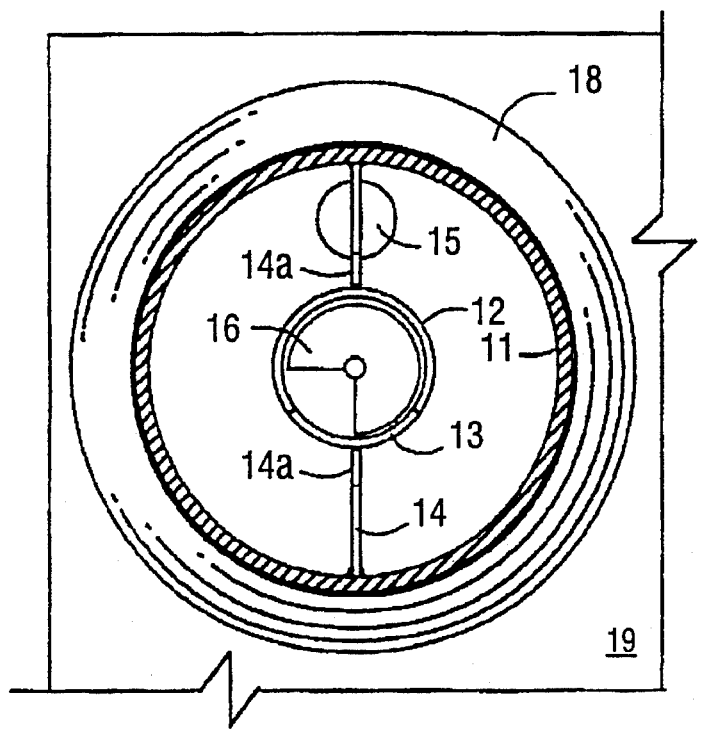
FIG. 10 is a cross-sectional view taken along lines 10—10 of FIG. 9 kiln.
Figure 11:
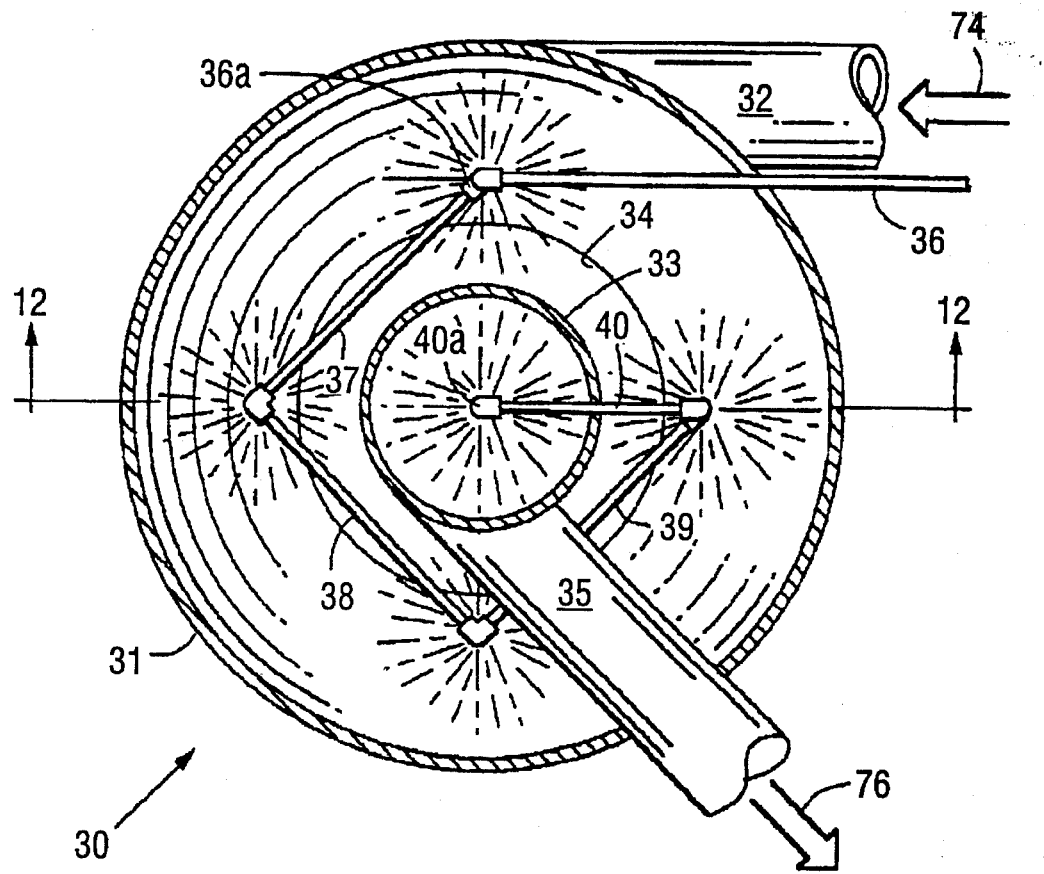
FIG. 11 is a plane view of the water cyclone.
Figure 14:
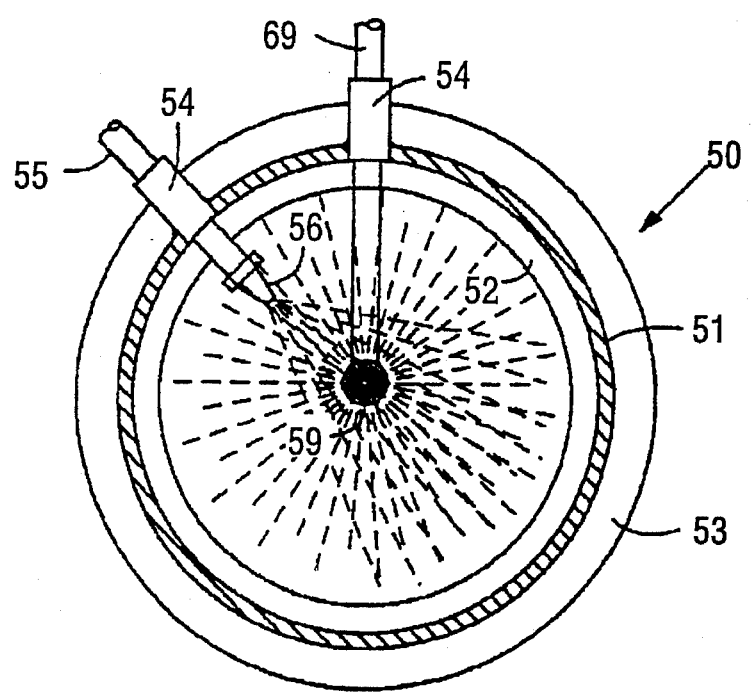
FIG. 14 is a cross-sectional view taken along lines 14—14 of FIG. 13. Item 56 depicts the spray nozzles that project into the quench tube.. Item 15 represents the coupling, item 55 represents a water supply line into said quench tube. The quench tube is also surrounded by an inner flange 52 and an outer flange 53.
Figure 12:
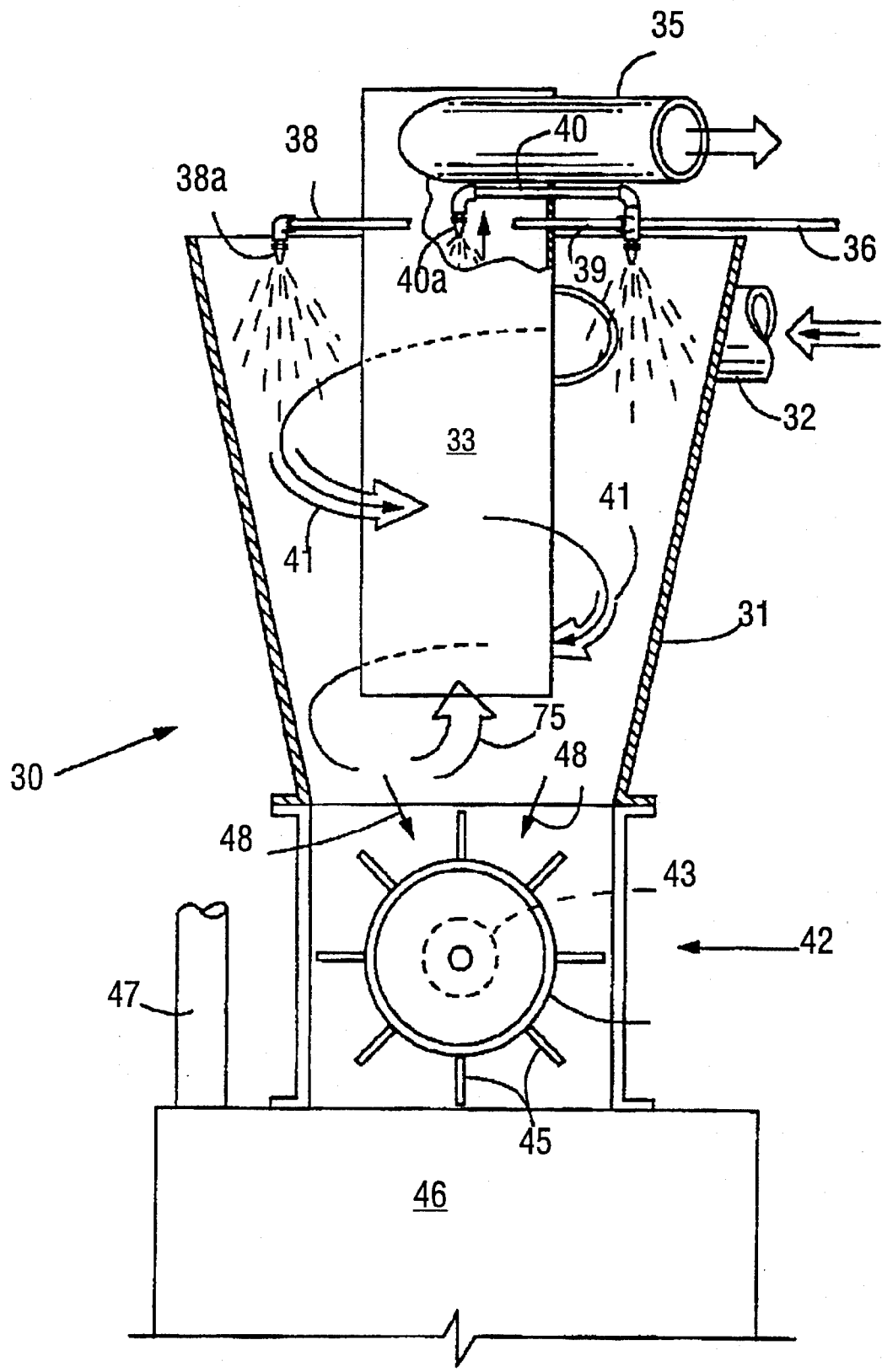
FIG. 12 is a partial cross-sectional view along lines 12—12 of FIG. 11 water cyclone.
Figure 16:
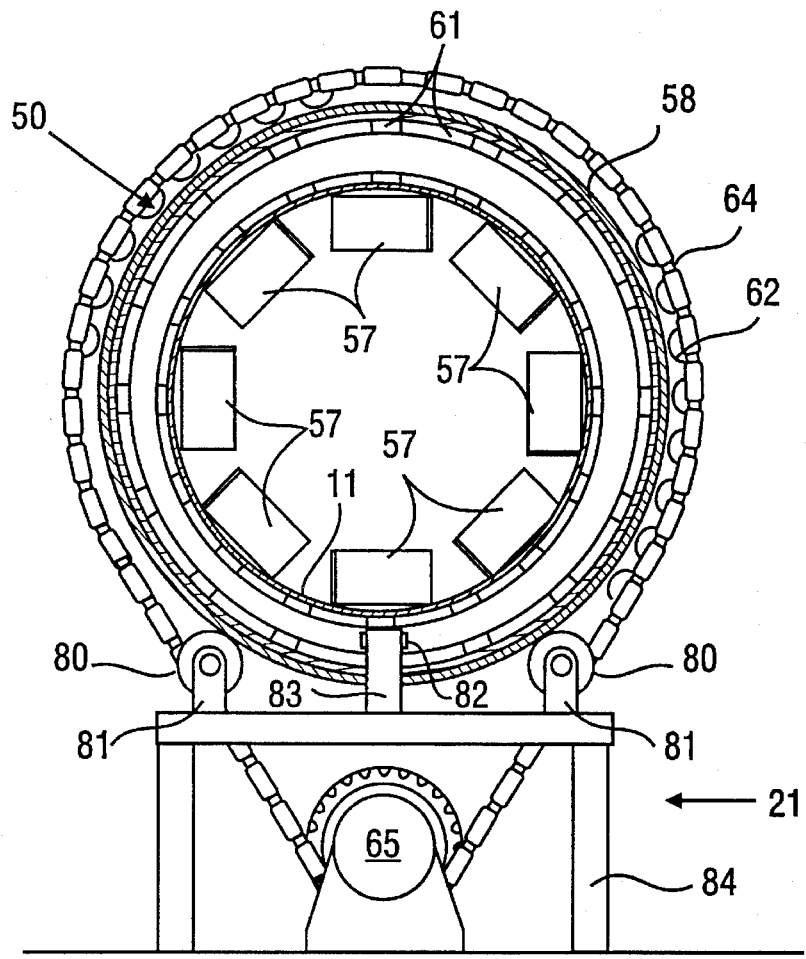
FIG. 16 is a cross-sectional view taken along lines 16—16 of FIG. 15. Stationary paddles 57 are mounted along the inside walls of said kiln.
Figure 19:
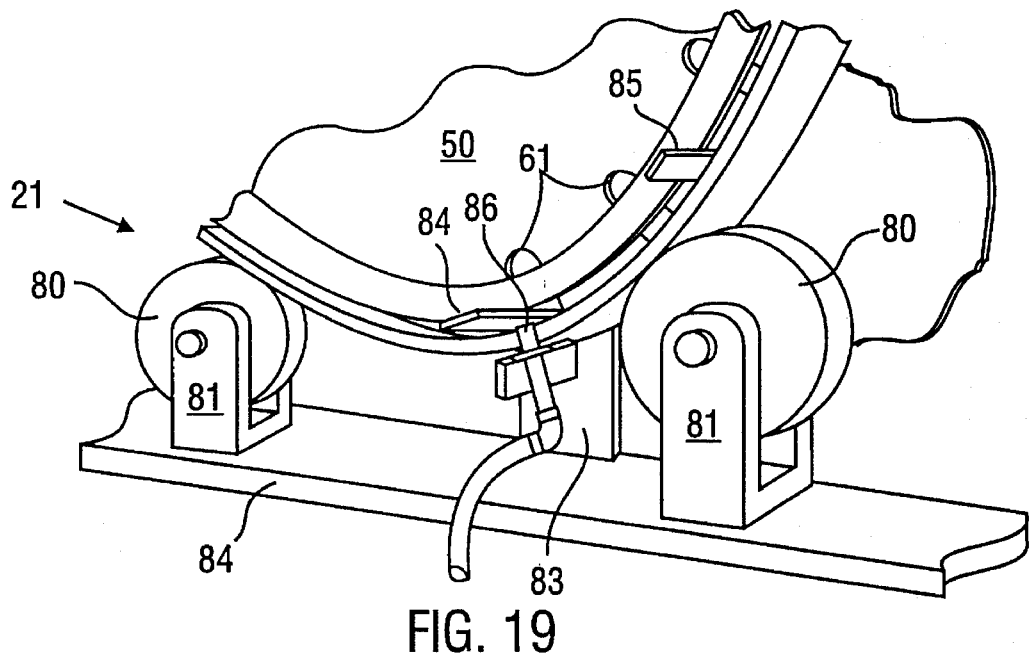
FIG. 19 is a perspective view of the cradle and sensor device.
Figure 17:
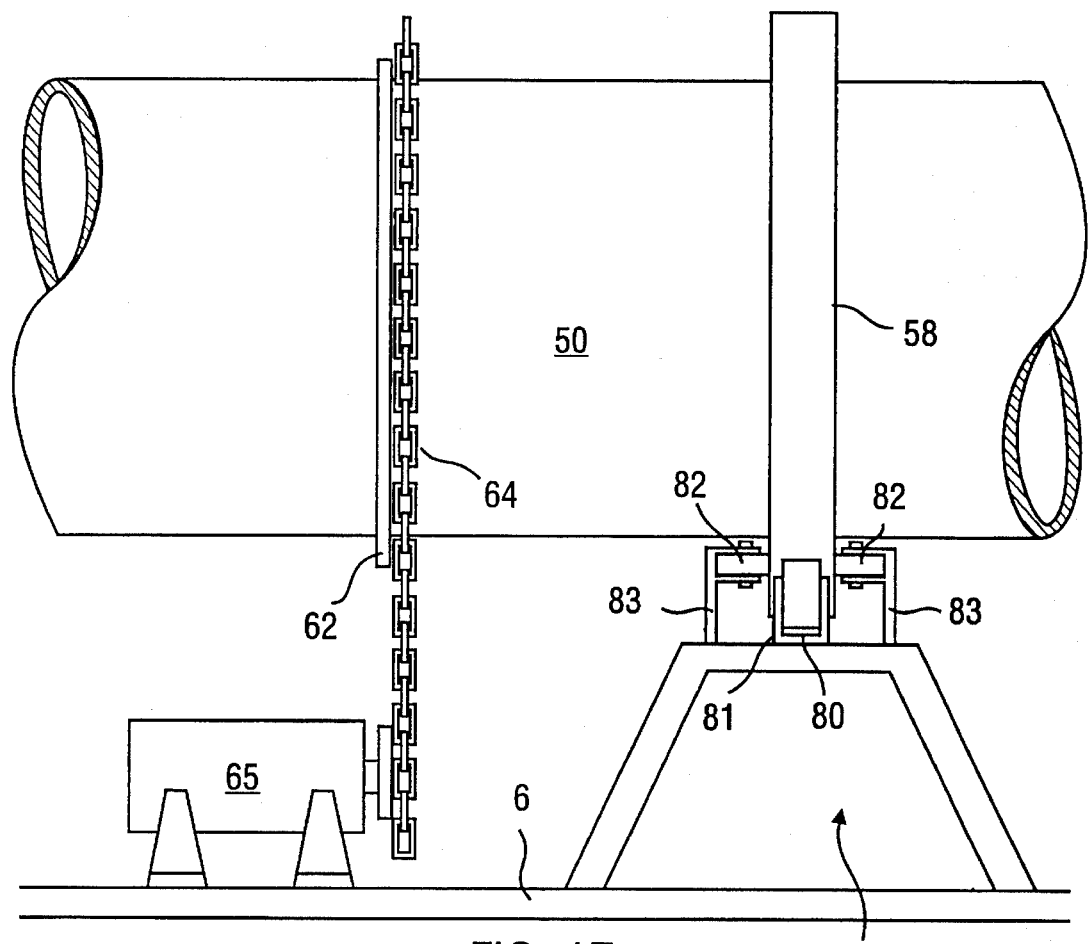
FIG. 17 is an elevated view of the kiln drive and cradle.
Figure 18:
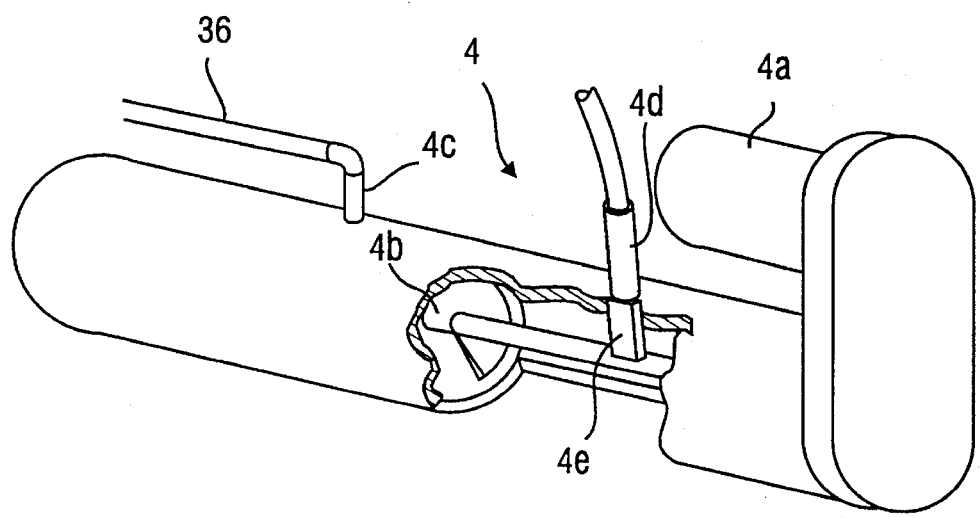
FIG. 18 is a perspective view of the exit auger 4, showing the motor drive assembly and sensor bars (first and second).

The rapid and efficient desorption of contaminants from a material achieved by the process and apparatus described herein depends in part on the type and particulate size of materials processed. For this purpose, the apparatus may also include a hammermill or crusher 12 that will initially reduce the size of the material to be processed to a convenient size, such as for example, to particles having a diameter of not more than 1½ inches. The hammermill or crusher 12 may also be fitted with a screen suitable for allowing only particles of this size or smaller therethrough. The sized particles may then be fed by a convendyor belt to an auger screw feed tube 16 entry port of the kiln 20 (FIG. 9).

The following list provides a source list of those materials that can be removed from a liquid or solid material with the claimed apparatus:

1. hydrocarbons
2. asphaltics
3. sulfur
4. volatile organic compounds
5. heavy metals (mercury, lead, etc.)
6. semi-volatiles
7. materials that can be vaporized from 200° to 1990°
8. biologically hazardous waste materials, including blood borne pathogens and hospital waste
9. sewage
10. landfill materials
11. sand
12. clay
13. industrial sludge
14. PCBs (As used in the present invention, defined as one of several colorless, aromatic liquid compounds containing two benzene nuclei with two or more substituent chlorine atoms)

An important feature of the present apparatus is to provide for the processing of contaminated materials without simultaneously generating materials that are not environmentally acceptable. The series of quench tube and water cyclone processing of gases, vapors, and water used and generated in the apparatus and process in part accomplishes this end, as contaminants are either completely vaporized or are precipitated into compact discharge tanks for convenient disposal, and water used in the system is completely recycled and purified, thus avoiding both a need for large quantities of flush water and the generation of contaminated water.

A preferred means for preparing a material for processing in accordance with the present invention is by hammering or otherwise crushing the material to an acceptable size. For example, the particulate material may first be processed through a hammermill or crusher 12 from a hopper 1, and then passed through a screen which allows a 1½ inch particle size to pass through each respective screen opening. The use of a hammermill/crusher 12 and screen to process a particulate material will generally increase the area of operation needed for the apparatus, but, still maintain this area within 2500 sq. ft.

In order to facilitate increased particle definition, the screen may vibrate and additionally may be used in conjunction with a system for mechanically vibrating the material into clumps. This particulating and screening process will additionally function to increase the surface area of each respective particle, as well as increasing the concentration of oxygen within the particulate material in order to facilitate more rapid desorption of contaminants from the material.

In operation, contaminated material, such as soil, is introduced into a hopper 1, FIG. 2. The particulate material is then transported by a belt scale 29 into the negative pressure kiln 20, FIG. 2. Unlike other systems, moisture is not added to a material prior to entry into the kiln, and in fact may make the processing of the material longer and less efficient. Thus, it is preferred that the material to be processed is kept as dry as possible prior to entry into the kiln so as to decrease kiln retention time.

In a preferred aspect of the operation of the apparatus, a sample of the material to be processed is first analyzed for hydrocarbon content, TPH, BTEX (benzene, toluene and ethylzylene, and TCLP (total contamination leachate and pesticides). This initial characterization of the material is very important, as the particular contaminants will dictate the temperatures used in the kiln. Once the major contaminants of the sample have been determined, the temperature in the kiln can be raised to ensure volatilization of that contaminant. For example, where the sample is found to contain toluene, an initial kiln temperature of 400° F. would be used. Where PCBs are found to contaminate the sample, temperatures of about 1200° F. would be used as the initial kiln temperature setting. In either case, the kiln would first be set at the slowest rotational speed. The speed would then be gradually increased, with a sample of the material being analyzed at each incremental increase in kiln speed. In this manner, the fastest rotational kiln speed that may be used while achieving the desired degree of material purity or decontamination.

The level of purity of a material as used in the description of the present processes and apparatus may be varied according to the desired end product needs of the operator. A sample processed to "purity" as used in the description of the present invention is defined as a processed material that is at least about 94% free of an identified contaminant. The present apparatus and process supplies materials that contain less than 1% contaminants, and also to levels known to those of skill in the art as nondetectable.

In the typical example, the material in the kiln is heated to a starting temperature of at least 750° F. by heating the kiln with a burner 26 located at the exit end of the fire box 2. The burner is most preferably a 487 Ovenpak Burner assembly purchased from Maxon Corporation. The burner assembly includes a blower. The heating of material in the kiln removes moisture from the sample and vaporizes volatile organic contaminants that may be present. The kiln during operation is continuously rotating a full 360° on a cradle. This rotation is further facilitated by a kiln motor drive 65, FIG. 4 and may be adjusted to achieve a variety of rotation speeds depending on the nature of the material being processed, the temperature maintained in the kiln, etc. In this regard, a computer controlled operational center 8, monitors the rotational speed and the temperature of the kiln.

As a general guideline, the rate at which soil material can be processed through the kiln will range from about 1 cubic yard per minute to about 50 cubic yards per minute. Those of skill in the art will appreciate the fact that the preceding is merely a guideline, and that actual processing times may vary greatly depending on the type of material that is to be processed, the type and concentration of contaminants in the material, and any number of factors including the solid or liquid nature of the material being processed.

The extreme heating of the processed material results in a volume of vaporized contaminants and either a liquid or particulate material in the kiln. Vaporized contaminants are evacuated from the kiln into an after burner chamber 3. The after burner chamber is also equipped with a burner assembly 27, again most preferably the 487 Ovenpak Burner assembly, including a burner and a blower, purchased from Maxon Corp. The vaporized contaminants are exposed to a direct flame-in the after burner chamber 3 to enhance oxidation of vaporized organic contaminants. The vaporized material is maintained in the after burner chamber for at least 0.6 seconds at a temperature of about 1600° F. The destruction efficiency for contaminants employing this process has been estimated to be 99.97%. The vaporized materials are then processed through a quench tube assembly 50 and a water box 5, and an elaborate water cyclone system 30 before exit to the atmosphere. In a most preferred embodiment, a test stack 9 having test stack ports 9a is included that is positioned after the water cyclone 30 and exhaust fan 1. These ports provide easy and quick access to gas emissions from the apparatus without the necessity for shutting down operations.

Any remaining heated solid material in the kiln from which volatile organic materials have been removed is then passed into a fire box 2 from the exit end of the kiln. All liquid materials will be vaporized in the kiln. In a most preferred embodiment, the exit end of the kiln also includes a bellows seal as the one previously described herein for the entrance end of the kiln. The fire box 2, as recalled, includes a burner assembly 26 and a blower. Here, the solid or liquid sample passes through an open flame for enhanced purification. The material is retained in the kiln 4 for between about 5 to about 25 minutes. Processed decontaminated material is then passed out of the fire box 2 through an exit auger discharge tube 4, the material being sprayed with water through water ports 4c to enhance cooling.

The various specific parts of the apparatus described above are treated in greater detail in the following descriptions and in the drawings.

Rotating Kiln

The rotating kiln 4 of the apparatus functions to house a number of stationary paddles 57 and a wiper blade 14 mounted to the inside wall of the kiln. The wiper blade 14 serves to maintain a clear pathway into a vapor vacuum port 15 into tube 17 to ensure efficient evacuation of gases and vapors generated in the kiln. In operation, constant rotation of the negative pressure kiln with the action of the stationary paddles provide a closed environment where the material is extensively aerated and suspended.

Generally, the kiln may take any size or shape which will support the processing of relatively large quantities of liquid or particulate materials. The size and shape of the kiln should also allow the burner flames to be focused on the intended portion of the chamber. As can be seen, one embodiment of the kiln 20 preferably has an elongated, generally cylindrical shape which may house any number of stationary paddles 57. In a most preferred aspect, the kiln provides a chamber that rotates 360° F. and is capable of being heated to temperatures in excess of 2000° F. In a most preferred aspect of the kiln, a 310 stainless steel, (310 SS) obtained from Ryerson Steel Products, Fort Worth, Tex. isused to construct the kiln.

While the kiln may take a variety of lengths ranging from as small as 2 feet to as large as, for example 50 feet, a preferred size for portability and large capacity processing is approximately 28 feet in length. The aforedescribed stationary paddles 57 which are permanently affixed to the inside walls of said kiln are also most preferably constructed of a 310 stainless steel.

Figure 7:
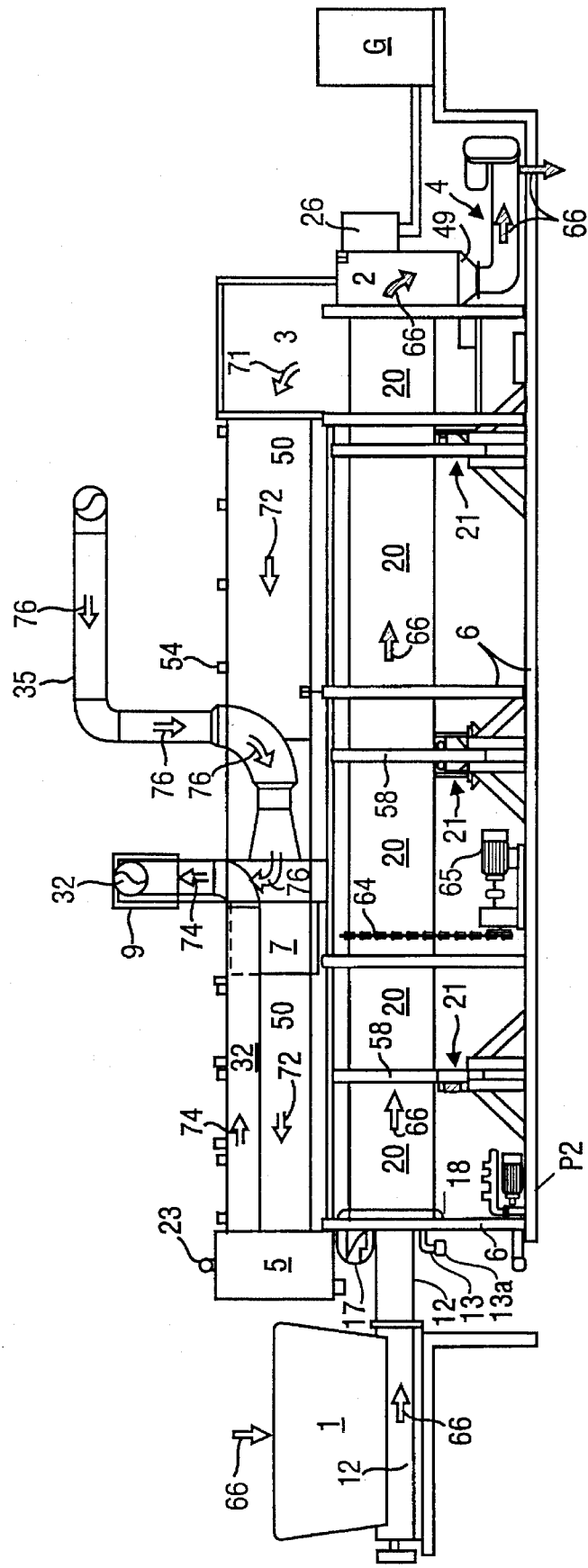
FIG. 7 is a side view of embodiment 2 of the thermal desorption.
Figure 8:
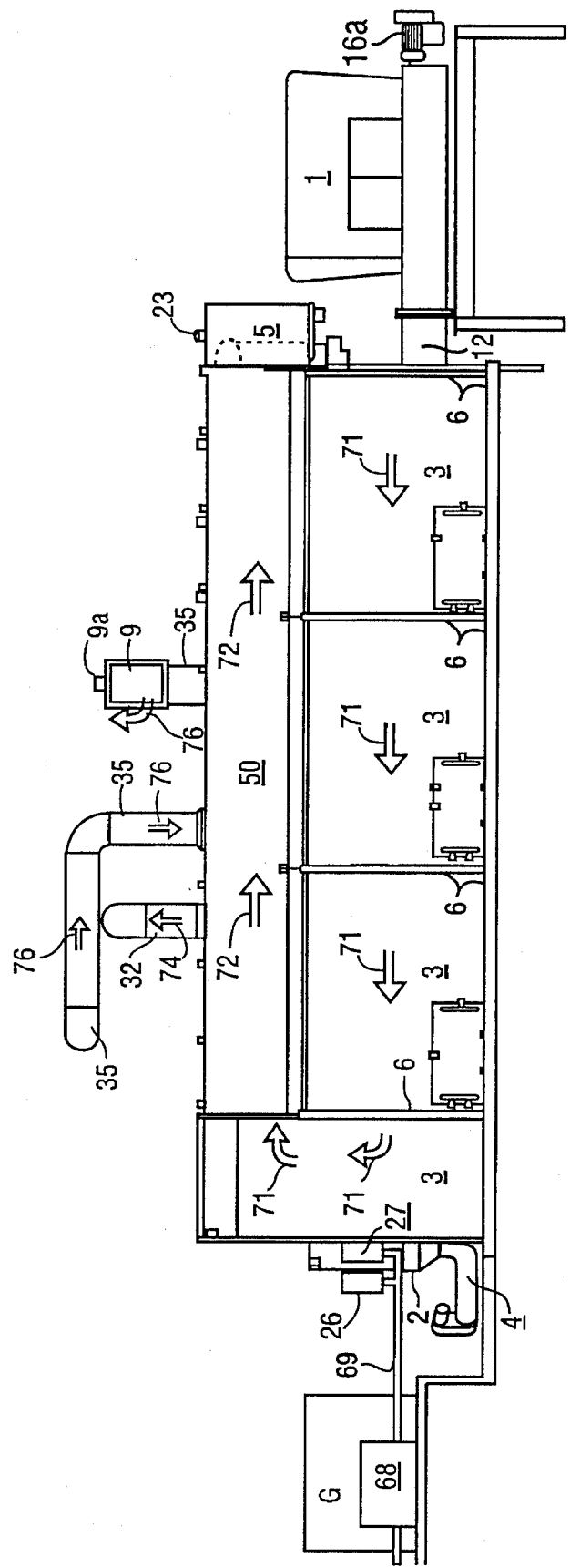
FIG. 8 is a side view of embodiment 2 of the thermal desorption unit.

The kiln 20 is heated by one or more flame burners 26 located behind the fire box 2. The function of these burners is to heat the kiln and the fire box to temperatures sufficient to vaporize any volatile organic material in the sample. Generally, burners which are useful in the apparatus of the present invention are those which project a flame towards the interior of the kiln in which the suspended material is concentrated. More specifically, as can be seen in FIG. 7, the burner blower assembly 26 is located behind the fire box 2. The burner flame is preferably fan projected so that a definite airflow pattern is established in that area of the kiln. Such is accomplished with the burner assembly that includes a blower purchased from Maxon Corporation.

The kiln includes an entrance auger feed tube 16 as well as a sludge and liquid injection port 13 for receiving dry particulate material and liquid materials, respectively into the kiln. The entrance auger feed tube 16 may take the form of a tube that extends about two feet into the interior of the kiln. (See FIG. 9, #12) A suction fan 22, FIG. 2, functions to evacuate the kiln of vaporized contaminants through a vapor port 15 and into vapor tube 17 (FIG. 9). This vapor port 15 is preferably located adjacent the entrance auger feed tube 16 of the kiln.

Figure 6:
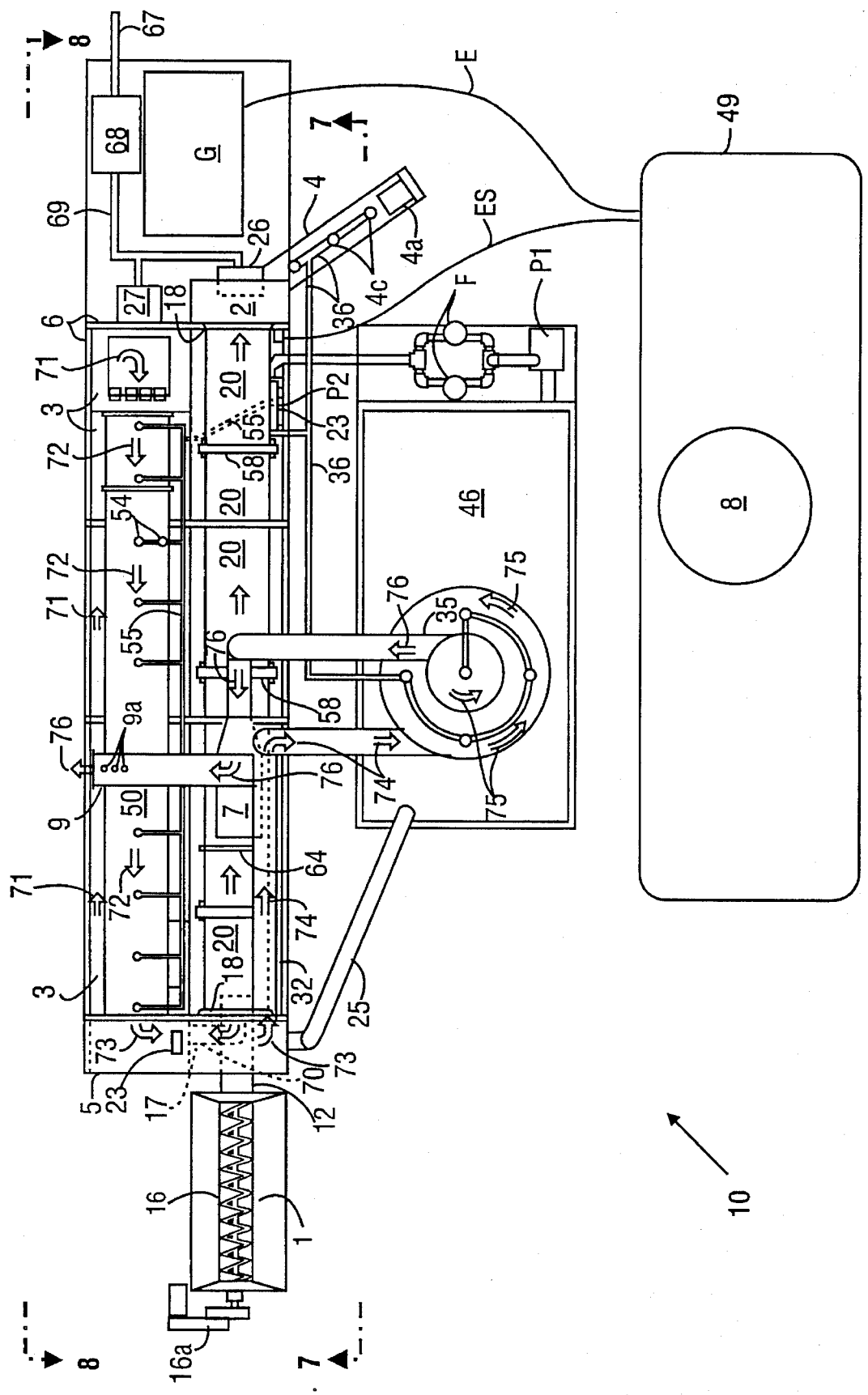
FIG. 6 is a top view of a second embodiment of the thermal desorption apparatus.

The suction fan 22 is not a required aspect of embodiment 2 of the apparatus, as represented in FIG. 6. The suction fan 22 can be eliminated without loss of efficiency by increasing the horse power of the exhaust fan to about 7½ horse power from 5 horse power. The kiln is also equipped with a wiper blade 14, FIG. 9, which functions to remove any fine particulate material that settles on the part of the entrance auger feed tube 16 adjacent vapor port 15. The wiper blade is stationary and relies on the rotation of the kiln itself to push away particulate matter settled on the entrance auger feed tube 16. In a most preferred embodiment of the herein described kiln, a second stationary wiper blade is permanently affixed on the inside kiln wall 180° from the first wiper blade 14.

The kiln is mounted within a frame 6 and lays and rotates in a cradle assembly 21, FIG. 4. The cradle allows for heat expansion and contraction of the kiln. A chain 64 encircles the kiln that is controlled by a two-piece sprocket gear 62 and drive motor 65 (see FIG. 16). Sprocket 62 bolts to the kiln in a fashion that allows for easy repair and maintenance in the event that one section of the sprocket is broken, and avoids the necessity for replacing an entire unit. The chain 64 operates like a bicycle chain in conjunction with the sprocket 62. A kiln drive motor 65, most preferably an electric motor with a variable speed, is employed to power the sprocket gear 62 and provide the rotation of the kiln within the aforedescribed cradle assembly 21. The variable speed of the drive allows for the custom regulation of the speed of the rotation of the kiln within the cradle.

The kiln is also equipped with at least one sensor 86 to monitor the rotation of the kiln. The sensor feeds information back to a central computer control 8. Where rotation is reported to be either impaired or stopped, the information is transmitted to the computer. The computer then shuts down the burners 26 and evacuates the kiln with ambient air as an added safety feature of the device.

The kiln is also insulated with a thermal blanket, such as those known to those of skill in the art. In a most preferred embodiment, insulation of the kiln is provided with UNI Lock modules that are six inches thick and twelve inches square, mounted with Unilock anchors and rigidizers obtained from E.J. Bartell Corp. The insulation of the kiln allows for the kiln to be cool to touch on the outside of the kiln, while maintaining temperatures of upwards of 2000° F. on the interior of the kiln.

The liquid injection port 13 allows for the passage and pumping of liquid waste, such as industrial sludge, crude oil, and the like into the rotary kiln for processing. In one preferred aspect, a hose may be attached to the liquid injection port 13 to provide the direct injection of a sludge or other volatile liquid material into the kiln. In such an application, the auger feed tube 16 is bypassed. The capacity to process volatile fluids with the herein described kiln system provides a novel and advantageous aspect of the apparatus not provided with any other processing apparatus known to the present inventor. In this regard, oil storage tank bottom sludge and live crude oil may be processed with the apparatus at a rate of 5.8 gallons per minute. The liquid injection port 13 may be capped with a cap 13a where only solid materials are being processed in the kiln.

The rotary kiln also includes at least at the entry end of the kiln a unique bellows seal system, 18 and 63, FIG. 9. The bellows seal employed with the kiln was manufactured by Bellows Systems, Inc., Odessa, Tex. In a preferred embodiment, the bellows 18 and 63 provide a seal to both ends of the kiln, and prevent the leakage of soil and smoke from the entry plate 19 and the exit port of the kiln. The bellows seal also allows for the expansion and contraction of the kiln during heating. The bellows seal is more particularly described as the structure 18 defined in FIG. 9, having a single projection down and two structures projecting up. These projections are more commonly referred to as "fingers" in the present description of the apparatus bellows seal. These multiple fingers, particularly those fingers projecting downward from the top of the bellows seal, allow for the entry of particulate matter into the kiln between the fingers. FIG. 9 also provides a side cutaway view of this bellows system. In a preferred embodiment, the exit end of the kiln leading to the fire box also includes a bellows seal. However, the escape of soil and smoke through the exit end of the kiln is not as significant a problem. However, it is expected that a kiln that includes a bellows seal sealing the entry of the kiln in contact with the kiln entrance port wall 19 without a bellows seal at the exit end of the kiln may be as efficacious for the purposes of the present invention.

The burner 26 is most preferably located at the fire box 2. The burner 26 most preferably also includes a thermocouple for monitoring temperature. Generally, burners useful in the present invention are those which provide 50 to 800,000 BTUs/minute given a standard propane fuel base. The burner 26 is also preferably fan blown to provide a definite flame direction and intensity in that area of the kiln 20 where the suspended particulate material or liquid material will be most prevalent. The preferred burner used in the present apparatus is the 487 Ovenpak Burner assembly already described. Generally, the burners are operated on a propane fuel at a temperature which may range from 800° F. –1500° F. and preferably is between 900° –1100° F., and most preferably about 1000° F.

The kiln may also be adjusted so as to function at any number of angles, thus enhancing the exposure of particulate surface area to the high temperatures and flame in the kiln. The angle of the kiln may be adjusted by lifting the entrance end of the kiln up through the use of a dolly located on the trailer skid on which the kiln is mounted. Increasing the angle of the kiln will increase the flow rate of material through the kiln, and thus increase the rate of material processing.

Generally, the stationary paddles 45 may be straight or angled relative to the length of the kiln. The paddles enhance the movement of particulate or liquid material, and move liquid and particulate material from the entrance end of the kiln towards the fire box 2. The paddles 45 positioned at an angle within the kiln will also decrease the retention time of the particulate matter within the kiln. The rotation speed, and temperature of the kiln, as well as the angle and number of paddles 45 may be modified to optimize the desorption process of contaminants by the apparatus. In operation, the kiln may generally rotate at a speed which ranges from about 1 rpm to about 55 rpm, preferably 25 to 45 rpm, and most preferably from about 30 rpm to 40 rpm.

The fire box 2 is most preferably insulated with ceramic cement, preferably KO Crete, purchased from E.J. Bartell, U.S. A down spout or trough 49 feeds out of the fire box into the exit auger discharge tube 4. A 310 stainless steel is preferably used in the construction of the fire box 2, the kiln 20 and the after-burner 3.

As already described, the vaporized contaminants pass through a vapor port 15 into vapor tube 17 into an after burner chamber 3 as depicted in the vapor flow line 70 (open arrows). The vapor port 15 is most preferably located just above the entrance auger feed tube 16. Vapors are directed through the vapor tube 17 directly through an open flame in the after burner chamber 3. A thermocouple in the vapor tube 17 functions to report vapor temperature to a central control computer 8, which is described in greater detail herein. FIG. 1 provides a diagram of the computer control of the various elements of the apparatus.

The component that extends the length of apparatus (see FIG. 3) is the after burner chamber 3. The after burner chamber 3 is preferably heated to a minimum of 1400° F. before operations begin, i.e., before a material is processed through the kiln. The temperature at which the after burner chamber can operate ranges between about 1400° F. to about 2600° F. Volatilized contaminants are retained in this after burner chamber for a minimum of 0.6 seconds to about 1.5 seconds. The after burner chamber also most preferably includes at least 3 separate thermocouples. These thermocouples function to monitor and report the temperature inside the after burner chamber. This information is also reported to a central computer 8. In operation, the computer will function to stop the burner 27 where temperatures in the after burner chamber 3 exceed 2600° F. A temperature reading in excess of 2600° F. will also result in the purging of the after burner chamber 3 with ambient air as a safety control. A UV eye control is also located within the after burner chamber 3 and monitors the flame and pilot therein. This information is also fed into the central computer control 8. Failure of the flame or pilot will result in the burner 27 being turned off and the purging of the after burner chamber with ambient air. The after burner chamber is insulated with an insulation blanket throughout the interior of the chamber. The floor of the after burner chamber is insulated with a KO Crete insulation obtained from E.J. Bartell.

Particulate material rendered from the exit auger fire box discharge tube in a most preferred embodiment of the invention is to be analyzed for the presence of any contaminants or other material. Accordingly, the disclosed apparatus may optionally include a mobile laboratory, such as for example, a mobile laboratory located near or in the mobile housing of the central computer 8. Most preferably, the portable laboratory is equipped to run EPA 8015 and 8020 analysis for total petroleum hydrocarbon (TPH) content and benzene, toluene, ethyl, and xylene (BTEX) content of entrance material samples and exit materials from the apparatus. The TPH and BTEX may then be reported in ppm. As already described, the information may be used to adjust kiln temperature and rotational speed to promote the more efficient removal of specific contaminants in a material.

Quench Tube System

The next element of the present apparatus is a quench tube system 50. This system functions to wash contaminants out of contaminant-containing vapors. In operation, water from the quench tube is in direct contact with the vapors and gases evacuated from the after burner 3. The fumes and vapors are drawn into the quench tube 51 from the after burner chamber 3, as shown in air flow line 71, depicted with open arrows at FIG. 5. The quench tube system functions to precipitate particulate matter that may be present in vapors, as well as to remove hydrocarbon pollutants that are released from materials processed in the kiln.

In accordance with one preferred aspect of the present invention, the quench tube includes an inner flange 52 and an outer flange 53. Water is sprayed into the quench tube 51 through water lines 55 attached at coupling 54 and sprayed through spray nozzles 56. At least two rows of spray nozzles are included through the length of the quench tube. At least one row is positioned to spray directly to the center of the tube, ("center" nozzles) while at least one row of nozzles is located at an angle to the first row of "center" nozzles. For example, the spray nozzles 56 in one aspect of the quench tube extend from the top center of the quench tube into the interior of the quench tube. The "center" spray nozzles 56 are most preferably a ⅜ AX SS 10 spraying system nozzle. The spray nozzles positioned at an angle, provide a washdown function for maintenance of the quench tube. The angled spray nozzles are most preferably a ⅜ AX SS 15 spray nozzles.

The quench tube 51 is most preferably constructed of a 309 stainless steel. The aforedescribed spray nozzles which extend from the top center of the quench tube function to spray water in a round fan pattern directly against the flow of the gases flowing into the quench tube from the after burner chamber. This action creates a back pressure which aids in reducing the retention time necessary to remove contaminants from vaporized materials of a sample material. The back pressure also allows for the maintenance of complete oxidation of the vapors at an efficiency of greater than 99.97%. The spray water system of the quench tube also provides for the removal of solid particles that may have become airborne. Heavy metals, such as mercury and lead, which enter in a vaporous state into the quench rude 51 may be resolidified and precipitated as they come into contact with water. These precipitated heavy metals are then flushed and deposited back into a water tank 46.

The quench tube is supplied by a water system supply line 55. Water from the quench tube drains directly into a wash box 5. Drainage of water back into the after burner chamber is prevented by a dam 52. The dam 52 efficiently prevents runoff of water into the after burner. The dam is most preferably constructed from a 309 stainless steel material.

Water used in the quench tube passes through a wash box 5 and water cyclone 30 with rotary 94, and through a water tank and filter screening system to render the water suitable for reuse in the apparatus. Flow line 73 (see FIG. 3) depicts this movement of water. In a most preferred aspect of the invention, the water supply to the quench tube is controlled by the central computer 8.

The wash box 5 is described as a rectangular steel box that is most preferably sandblasted and zinc-coated to enhance scale resistance and rust resistance. Water and solid particulate material contained within the water drained from the quench tube is removed in the wash box and funneled into a drain 25. A high heat resistant 3½ inch OD PVC pipe is attached to the drain and functions to conduct the fluid and solids from the wash box 5 to the tank 46. The wash box is also supplied by a water supply 23 and a water return line 25 (see FIG. 4). A gas exit port 26 is also part of the wash box, and allows gas that may pass into the wash box to exit to the environment.

Water Cyclone and Water Recycling System

The next element of the present invention is a water cyclone apparatus 30. The water cyclone apparatus is a modified air cyclone that includes a sandblasted interior upon which has been prepared a coating that is both scale resistant and rust resistant. Most preferably, this coating is zinc, which enhances the ease with which the interior of the cyclone may be cleaned. Water from the wash box enters into the water cyclone through an inlet tube 32, along the water flow line depicted with the solid black arrows (see FIG. 12).

The steam and gas from the wash box first enter the cone shaped outer chamber 31 of the water cyclone assembly, where it is mixed with fresh water sprayed into said chamber through water nozzles 38a and 39a. Water supply lines 38 and 39 supply these nozzles 38a and 39a respectively.

Any residual vapors and gases flow into an interior vapor outlet tube 33 of the water cyclone, where they are again washed by water sprayed from water nozzle 41 fed by water supply line 40. The washed vapors are then released through vapor outlet tube 35. Emissions from the vapor outlet tube include steam, $CO_2$ and $O_2$.

Where sulfur is one of the contaminants in the material being processed, sulfur will enter a vapor state and combine with water in the water cyclone to form sulfuric acid. The sulfuric acid would then wash down to the tank 46, along with any ash and fines produced. Processing of sulfur-containing materials in this fashion eliminates or significantly reduces the development of acid rain from sulfur-containing emissions. This is accomplished primarily with the mixture of the sulfur-containing emissions with ash and water from the water tank 46. In a most preferred embodiment, every pipe, valve, tank, box and other part of the apparatus that comes in contact with water or that may come in contact with water that is not constructed of stainless steel is sandblasted and preferably coated with zinc.

The water sprayed into the water cyclone drops down through a bottom outlet 34 into a rotary assembly 42. The rotary assembly includes a motor 43 that drives a rotary cylinder 44 with radiating paddles 45. This processing of the water through the rotary assembly functions to enhance the evacuation of the water from the water cyclone as the motor maintains the speed of rotation of the rotary 44. The water then flows into a tank 46 and is forced out of the water tank by a pump P, and finally through a filter, most preferably a filter system obtained from APPCOR, serial #SSP85-2-304-150-2" Flg. The water is then recycled through water feed lines to the quench tube 50, wash box 5, and water cyclone assembly 30. This water flow and recycling is represented diagrammatically at FIG. 2.

In a most preferred embodiment, the apparatus includes two water pumps of the aforedefined type to enhance water pumping efficiency in the water recycling system of the apparatus. Preferred embodiments of the apparatus also include a sewage pump to remove residual particulate material from the tank 46.

Computer Control

Computer system 8 depicts the central computer control most preferably used to run and monitor individual components of the apparatus. The flow of computer control is diagrammed in FIG. 1. The computer 8 may preferably be located within a command trailer, along with an elemental analysis laboratory for material samples. All unit instrumentation is programmed to report working order and temperatures to the central computer. As already described, the computer system is programmed to automatically shut off the burners, motors, etc. and to purge the system with ambient air in the event of malfunction of the apparatus. The system is also equipped with a self diagnostic capacity to identify to the operator of the apparatus and nature of the failed part. The computer system is also programmed to log all operating temperatures periodically during operation (every 15 minutes).

Appendix A sets forth the source code program used in the successful programming of operations of the apparatus described herein. Electrical umbilical cords E connect the generator G, located opposite the wash box 5 (see FIG. 3) and attach to the computer 8. The entire system is in the most preferred embodiment of the device and controlled by an Allen Bradley programmable logic controller. All information may be displayed on a color-touch screen monitor.

The apparatus and computer control are fashioned for one button automated start-up and shut down procedure. The screen displays all temperatures that are preset. The computer is most preferably preset to generate a hard copy printout of all data affected in the process every four hours. The temperatures of the various component parts of the apparatus are recorded by the computer most preferably every 15 minutes.

The belt scale 29 gives the client/operator an accumulated tonnage printed every 24 hours on a printer that is recorded by the computer control unit 8. There is a separate digital report screen showing current tons per hour as it is going over the belt. This instrument is preferably fully calibrated.

The laboratory is run by a computer that also shares the system controller printer. Any personal computer may be used to run analysis programs and printing test results generated from analysis of materials. Of course, one of skill in the art may incorporate a word processing software package on the hard disk.

Actual production throughput the process of the present invention is reported in tons per hour and will generally be specific to the nature of the material at the contaminated production site being processed. The main variables include concentration of contaminants, moisture level, and type of material. The thermal desorption apparatus is rated at between 20 and 40 tons per hour under optimum conditions. A typical shift would be 24 hours per day, 7 days per week. Equipment must be shut down for about 45 minutes every 2 days or so for service. 98.5% of the maintenance on the apparatus is designed for work site amenability, thus enhancing the maintainability, production, and profitability of the apparatus in operation.

The following materials are most preferred in the construction of the thermal desorption unit disclosed herein:

| COMPONENTS, PARTS, SUPPLIES | |
|---|---|
| BLOWERS: Grainger | 5hp Model 3N659-A |
| | Model 3C281, |
| | 7C331 #XF213TTFS8031AP-L |
| BURNERS: Maxon Corp. | 487 Ovenpak Burner assembly |
| CONTROL SYSTEM: | Bynum Controls |
| CYCLONE: | Mill & Elevator Supply |
| | 800-821-5578 |
| | 14"--4276 CFM Max 6500 |
| FILTER SYSTEM: | APPCOR (602-886-5329) |
| | Ser. #SSP85-2-304-150-2"Flg |
| | Set rated @ 92KW |
| | Legs #4085-8 |
| | Gasket #4085-V-FSP |
| GAS CHROMATOGRAPH: | Buck Scientific Model #8610-50 |
| GENERATOR: | Stewart & Stevenson GT-125 |
| | Generac |
| | set rated @ 92KW |
| | Ser. #SD-100-Q3664B18BDYY |
| INSULATION: | E. J. Bartell UNI Lock Modules |
| | 6"X12" |
| | Unilock Anchors |
| | Rigidizers |
| | KO Crete |
| NOZZLES: | Spraying Systems |
| | ⅜ AX SS10 |
| | ⅜ AX SS15 |
| STEEL: | Ryerson Steel Products |
| | Fort Worth, Texas |
| | angle iron |
| | ¼ inch carbide |
| | 309 SS |
| | 310 SS |

Both the SS10 and SS15 nozzles are used as the water nozzles 56 affixed to the inside walls of the quench tube 50.

| PUMPS: | Teel centrifugal 7 ½ hp #3P663-2 |
|---|---|
| | 1 hp sewage pump 230V |
| SCREW CONVEYOR: | Industrial Screw & Conveyor |

Fuel Requirements

The primary and secondary burners will burn from 55 to 100 gallons of propane per hour. Electricity for the thermal desorption apparatus is supplied by a 125 kw generator. This unit runs on about 40 gallons of diesel per day. The apparatus also most preferably includes an electrical system that allows for an auxilliary power source inlet so that commercially available power sources may be used with the apparatus as well, in which case the electrical generator would not be needed.

The following Examples 1 and 2 provide production data results generated with the herein disclosed apparatus for the removal of contaminants from both liquid and solid contaminated materials.

EXAMPLE 1

Production Data With Crude Oil and Asphalt

The thermal apparatus is used to process contaminated sand to 98,000 ppm. The first run was on asphalt. When the kiln temperature was set to 1,000° and a retention time was six minutes, the processed material tested 18 ppm. The contaminated sand that contained crude oil was run at the same temperature and retention time settings and tested nondetect for any remaining contaminants in the processed sand. All crude oil was therefore effectively removed.

EXAMPLE 2

Production Data with Motor Oil, Waste Oil, Cutting Oil and Solvent in Soil Production Data with Live Crude and Tank Bottom Sludge Approximately 500 tons of contaminated soil were stock piled at one location. The contamination level exceeded 28,000 ppm. The contaminated soil was saturated with five barrels of combined motor oil, waste oil, cutting oil, and solvent.

The soil was fed into the unit at a rate varying from 15 tons (hand feeding) to 38 tons per hour with a proper feeder. After processing, non-detectable levels of contaminants were observed in the soil material.

A load of live crude and tank bottom sludge was also processed. This material was pumped into the unit through the liquid injection port 13 at a rate of 5.8 gallons per minute. The results indicated non-detectable levels of contaminants in the processed material.

What is claimed is:

1. A thermal desorption process for removing contaminants from contaminated material, said process comprising the steps of:
    a) providing a thermal desorption apparatus comprising:
        a rotating kiln having an entrance port disposed in a front end of said rotating kiln, an exit port disposed in a rear end of said rotating kiln, and a vapor port disposed toward the top of at least one of the front or rear ends of said rotating kiln;
        a quench tube having first and second ends, an interior chamber with at least one spray nozzle disposed within, an inlet disposed in said first end of said quench tube, and an outlet disposed in said second end of said quench tube, wherein said inlet is in communication with the vapor port of the rotating kiln, and wherein at least one spray nozzle is oriented in said interior chamber to face the inlet of said quench tube;
        a water cyclone comprising:
            an outer chamber having a perimeter, a first end, a second end, and at least one water nozzle disposed within,
            an inlet tube disposed in the perimeter of said outer chamber and being in communication with the quench tube outlet,
            a vapor outlet tube disposed in the first end of said water cyclone outer chamber,
            an interior vapor outlet tube connected to said vapor outlet tube and being disposed within said water cylcone outer chamber, and having at least one water nozzle disposed within, said at least one water nozzle oriented to face the second end of said water cyclone outer chamber, and
            a bottom outlet disposed in said second end of said water cyclone outer chamber;
    b) introducing contaminated material into the rotating kiln;
    c) heating the contaminated material inside the rotating kiln with a burner flame to vaporize contaminants and form particulate exit materials;
    d) removing the particulate exit materials from the exit port of the rotating kiln, and removing the vaporized contaminants from the vapor port of the rotating kiln;
    e) measuring at least one of the temperature of the particulate exit materials, the temperature of the kiln, or the presence of contaminants in the particulate exit materials;
    f) adjusting at least one of a burner flame temperature, rotation speed of the kiln, or a relative elevation of the front end of said rotating kiln with respect to the rear end of said rotating kiln based on at least one of the measurement of the temperature of the particulate exit materials, the temperature of the kiln, or the presence of contaminants in the particulate exit materials;
    g) oxidizing the vaporized contaminants to form a gas;
    h) introducing the gas into the inlet of the quench tube and subjecting the gas to a spray of water from the at least one water nozzle disposed in said interior chamber and oriented to face the inlet of said quench tube;
    i) removing the gas from the outlet of the quench tube, introducing the gas into the inlet tube of the water cyclone, and subjecting the gas to a spray of water from the at least one water nozzle located in the outer chamber of the water cyclone;
    j) removing the gas from the vapor outlet tube of the water cylcone, wherein the gas is subjected to a spray of water from the at least one spray nozzle disposed in the interior vapor outlet tube and oriented to face the second end of the water cyclone outer chamber.

2. The process of claim 1, further comprising the steps of analyzing the contaminated material prior to the step of heating the contaminated material inside the rotating kiln, and adjusting the rotating kiln temperature by varying at least one of a burner flame temperature, rotation speed of the kiln, or a relative elevation of the front end of the rotating kiln with respect to the rear end of the rotating kiln.

3. The process of claim 1, wherein the contaminated material is introduced into the entrance port of the rotating kiln at a rate of from about 20 tons to about 40 tons of contaminated material per hour.

4. The process of claim 1, wherein the contaminated material is a solid and wherein the process comprises a first step of reducing the solid material to particles not more than 1½ inches in diameter.

5. The process of claim 1, wherein the step of oxidizing comprises oxidizing the vaporized contaminants at a temperature ranging from about 1400 ° F. to about 2600 ° F.

6. The process of claim 1, wherein the step of heating comprises heating the material inside the rotating kiln to a temperature of about 1000° F. or greater.

7. The process of claim 6, wherein the step of providing a thermal desorption apparatus comprises the step of providing an insulated rotating kiln constructed of 310 stainless steel and further comprising a bellows seal disposed at at least one of the front or rear ends of the kiln.

8. The process of claim 1, wherein the contaminants comprise at least one of heavy metals, hydrocarbons, polychlorinated biphenyls, or a mixture thereof.

9. The process of claim 8, wherein the heavy metals comprise at least one of mercury, lead, or a mixture thereof.

10. The process of claim 1, wherein the particulate exit materials contain less than about 1% contaminants.

11. The process of claim 1, wherein the step of providing a thermal desorption apparatus comprises the step of providing a rotating kiln having a sludge and liquid injection port disposed in the front end of the rotating kiln, and wherein the step of introducing contaminated material into the rotating kiln comprises introducing contaminated sludge or liquid material into said sludge and liquid injection port disposed in the front end of the rotating kiln.

12. The process of claim 11 wherein said contaminated sludge or liquid material comprises at least one of industrial sludge, sewage, or a mixture thereof.

13. The process of claim 1, wherein the step of oxidizing comprises the step of introducing the vaporized contaminants into an afterburner, said afterburner having an inlet in communication with the vapor port of the rotating kiln and having an outlet in communication with the inlet of the quench tube.

14. The process of claim 1, wherein the step of removing the gas from the outlet of the quench tube comprises the step of introducing said gas into a wash box having an inlet in communication with the outlet of the quench tube, and an outlet in communication with the inlet tube of the water cyclone.

15. The process of claim 1, wherein the step of removing the particulate exit materials comprises the step of introducing said particulate exit materials into a front end of a fire box, said front end of said fire box being in communication with the rear end of the rotating kiln, and said fire box having a discharge tube disposed in communication with a rear end of the fire box.

16. The process of claim 15, wherein the step of removing the particulate exit materials comprises the step of subjecting said particulate exit materials to water spray from at least one spray nozzle positioned in the discharge tube of the fire box.

17. The process of claim 14, wherein the step of introducing the gas into a washbox comprises the steps of separating water from said gas, removing said water to at least one tank from said washbox through a drain disposed toward a bottom of said washbox and being in communication with said at least one tank, and filtering said water for reuse in the process through a filter disposed in communication with said tank.

18. The process of claim 1, wherein the step of removing the gas from the vapor outlet tube of the water cyclone comprises the steps of:

removing water from the bottom outlet of the water cyclone through a rotary assembly disposed in communication with said bottom outlet, introducing said water into at least one filtering tank disposed in communication with the bottom outlet of the water cyclone; and filtering said water through a filter disposed in communication with the bottom outlet of the water cyclone for reuse in the process.

19. The process of claim 1, wherein the step of subjecting the gas to a spray of water in the quench tube comprises the step of controlling the spray of water with a computer.

20. The process of claim 1, wherein the step of heating the contaminated material inside the rotating kiln comprises the step of agitating said contaminated material inside said kiln with stationary paddles disposed in contact with inside walls of said kiln.

21. The process of claim 20, wherein a longitudinal axis of each stationary paddle is longitudinally disposed so as to form an angle with a longitudinal axis of the rotating kiln, said angle oriented in such a way to move liquid or particulate exit materials toward the exit port of the rotating kiln.

22. The process of claim 1, wherein the step of providing a thermal desorption process comprises the step of providing a thermal desorption apparatus that is portable.

23. The process of claim 1, wherein the step of providing a thermal desorption apparatus comprises providing a rotating kiln having at least one wiper blade disposed adjacent to the entrance port of the rotating kiln.

24. A thermal desorption process for removing contaminants from contaminated material, said process comprising the steps of:

a) providing a thermal desorption apparatus comprising:
  a rotating kiln having an entrance port disposed in a front end of said rotating kiln, an exit port disposed in a rear end of said rotating kiln, and a vapor port disposed toward the top of said rotating kiln;
  a quench tube having first and second ends, an interior chamber with at least one spray nozzle disposed within, an inlet disposed in said first end of said quench tube, and an outlet disposed in said second end of said quench tube, wherein said inlet is in communication with the vapor port of the rotating kiln, and wherein at least one spray nozzle is oriented in said interior chamber to face the inlet of said quench tube;
  a water cyclone comprising:
    an outer chamber having a perimeter, a first end, a second end, and at least one water nozzle disposed within,
    an inlet tube disposed in the perimeter of said outer chamber and being in communication with the quench tube outlet,
    a vapor outlet tube disposed in the first end of said water cyclone outer chamber,
    an interior vapor outlet tube connected to said vapor outlet tube and being disposed within said water cylcone outer chamber, and having at least one water nozzle disposed within, said at least one water nozzle oriented to face the second end of said water cyclone outer chamber, and
    a bottom outlet disposed in said second end of said water cyclone outer chamber;

b) introducing contaminated material into the rotating kiln;

c) heating the contaminated material inside the rotating kiln to vaporize contaminants and form particulate exit materials;

d) removing the particulate exit materials from the exit port of the rotating kiln, and removing the vaporized contaminants from the vapor port of the rotating kiln;

e) adjusting a relative elevation of the front end of said rotating kiln with respect to the rear end of said rotating kiln;

f) oxidizing the vaporized contaminants to form a gas;

g) introducing the gas into the inlet of the quench tube and subjecting the gas to a spray of water from the at least one water nozzle disposed in said interior chamber and oriented to face the inlet of said quench tube;

h) removing the gas from the outlet of the quench tube, introducing the gas into the inlet tube of the water cyclone, and subjecting the gas to a spray of water from the at least one water nozzle located in the outer chamber of the water cyclone;

i) removing the gas from the vapor outlet tube of the water cylcone, wherein the gas is subjected to a spray of water from the at least one spray nozzle disposed in the interior vapor outlet tube and oriented to face the second end of the water cyclone outer chamber.

25. A portable thermal desorption process for removing contaminants from contaminated material, said process comprising the steps of:

a) providing a portable thermal desorption apparatus comprising:
   an elongated cylindrical rotating kiln having an entrance port disposed in a front end of said rotating kiln, an exit port disposed in a rear end of said rotating kiln, a sludge and liquid injection port disposed in the front end of said rotating kiln, a vapor port disposed toward the top of said rotating kiln, stationary paddles affixed to inside walls of said kiln, and one or more flame burners disposed in position to heat the kiln, said elongated rotating kiln forming an angle with a longitudinal axis of the apparatus, wherein a temperature of the flame burners, rotation speed and angle of the kiln are adjustable; and
   a trailer for transporting said apparatus;

b) introducing contaminated material into the rotating kiln;

c) heating and agitating the contaminated material inside the rotating kiln to vaporize contaminants and form particulate exit materials;

d) removing the particulate exit materials from the exit port of the rotating kiln, and removing the vaporized contaminants from the vapor port of the rotating kiln;

e) analyzing the particulate exit materials for the presence of contaminants;

f) adjusting at least one of a burner temperature, rotation speed or angle of the kiln based on the analysis of the particulate exit materials.

26. A portable thermal desorption process for removing contaminants from contaminated material, said process comprising the steps of:

a) providing a portable thermal desorption apparatus comprising:
   a quench tube having first and second ends, an interior chamber with at least one spray nozzle disposed within, an inlet disposed in said first end of said quench tube, and an outlet disposed in said second end of said quench tube, and wherein at least one spray nozzle is oriented in said interior chamber to face the inlet of said quench tube;
   a water cyclone comprising:
      an outer chamber having a perimeter, a first end, a second end, and at least one water nozzle disposed within,
      an inlet tube disposed in the perimeter of said outer chamber and being in communication with the quench tube outlet,
      a vapor outlet tube disposed in the first end of said water cyclone outer chamber,
      an interior vapor outlet tube connected to said vapor outlet tube and being disposed within said water cylcone outer chamber, and having at least one water nozzle disposed within, said at least one water nozzle oriented to face the second end of said water cyclone outer chamber;
      a bottom outlet disposed in said second end of said water cyclone outer chamber, and
      a trailer for transporting said apparatus;

b) introducing gas formed from the oxidation of vaporized solid or liquid contaminants into the inlet of the quench tube, and subjecting said gas to a spray of water from the at least one water nozzle disposed in said interior chamber and oriented to face the inlet of said quench tube;

c) removing the gas from the outlet of the quench tube, introducing the gas into the inlet tube of the water cyclone, and subjecting the gas to a spray of water from the at least one water nozzle located in the outer chamber of the water cyclone; and d) removing the gas from the vapor outlet tube of the water cylcone, wherein the gas is subjected to a spray of water from the at least one spray nozzle disposed in the interior vapor outlet tube and oriented to face the second end of the water cyclone outer chamber.

* * * * *